US011135657B2

(12) United States Patent
Fautz et al.

(10) Patent No.: US 11,135,657 B2
(45) Date of Patent: Oct. 5, 2021

(54) INTERFACE BETWEEN A COLLET HOLDER AND A TOOL ADAPTER

(71) Applicant: WTO VERMOEGENSVERWALTUNG GMBH, Ohlsbach (DE)

(72) Inventors: Tobias Fautz, Zell am Harmersbach (DE); Sascha Tschiggfrei, Gengenbach (DE); Karlheinz Jansen, Schutterwald (DE)

(73) Assignee: WTO VERMOEGENSVERWALTUNG GMBH, Ohlsbach (DE)

( * ) Notice: Subject to any disclaimer, the term of this patent is extended or adjusted under 35 U.S.C. 154(b) by 37 days.

(21) Appl. No.: 16/636,450

(22) PCT Filed: Aug. 14, 2018

(86) PCT No.: PCT/EP2018/072068
§ 371 (c)(1),
(2) Date: Feb. 4, 2020

(87) PCT Pub. No.: WO2019/038146
PCT Pub. Date: Feb. 28, 2019

(65) Prior Publication Data
US 2021/0178491 A1    Jun. 17, 2021

(30) Foreign Application Priority Data
Aug. 25, 2017    (DE) .................... 10 2017 119 524.6

(51) Int. Cl.
*B23B 31/20*    (2006.01)
*B23B 31/107*    (2006.01)

(52) U.S. Cl.
CPC .......... *B23B 31/1076* (2013.01); *B23B 31/20* (2013.01); *B23B 2231/04* (2013.01)

(58) Field of Classification Search
CPC ... B23B 31/20; B23B 31/201; B23B 31/2012; B23B 2231/04; B23B 2231/20;
(Continued)

(56) References Cited

U.S. PATENT DOCUMENTS 2,167,014 A * 7/1939 Verderber ............... B23B 31/06
279/83
3,762,731 A    10/1973 Matsumoto et al.
(Continued)

FOREIGN PATENT DOCUMENTS

CN    101010162 A    8/2007
CN    101134247 A    3/2008
(Continued)

OTHER PUBLICATIONS

China Patent Office "Office Action" dated Mar. 16, 2021, China.
German Patent and Trade Mark Office "German Examination Report", dated Jul. 16, 2018, Germany.

*Primary Examiner* — Eric A. Gates
*Assistant Examiner* — Chwen-Wei Su
(74) *Attorney, Agent, or Firm* — WPAT, PC

(57) ABSTRACT

The invention relates to an interface between a collet holder and a tool adapter, said interface being simple in construction and in which the insertion of a tool adapter is possible in a simple manner even in confined spaces.

22 Claims, 17 Drawing Sheets

Figure 1A:
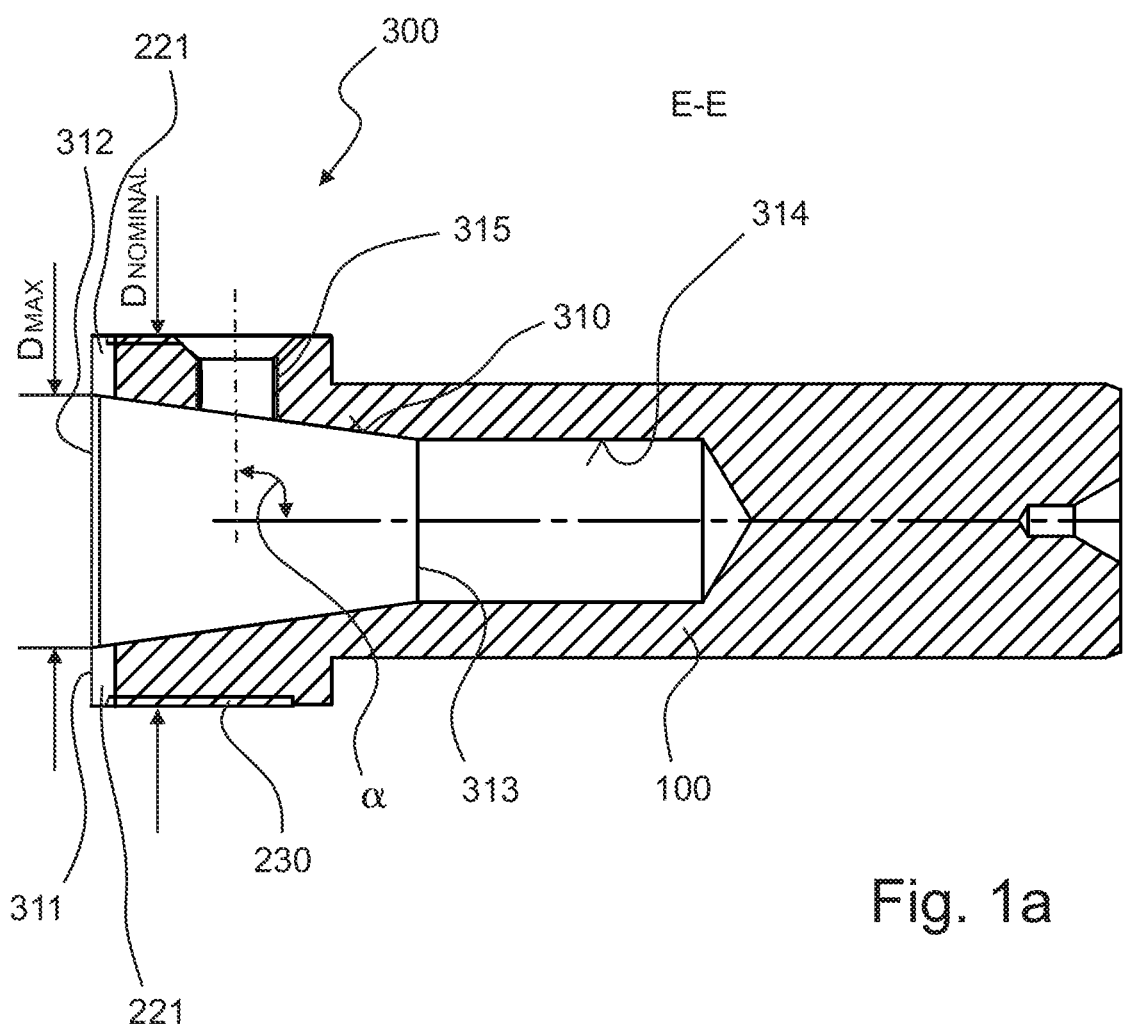

(58) Field of Classification Search
CPC ........ B23B 2231/2008; B23B 2231/46; B23B 31/107; B23B 31/1076; B23B 31/1073; B23B 31/1075; B23B 31/10741; B23B 31/008; B23B 51/12; B23B 2260/026; Y10T 279/17299; Y10T 279/17341; Y10T 279/17504; Y10T 279/17581; Y10T 279/3406

See application file for complete search history.

(56) References Cited

U.S. PATENT DOCUMENTS

| | | | |
|---|---|---|---|
| 4,437,801 | A | 3/1984 | Lewis |
| 8,257,003 | B2 | 9/2012 | McCormick et al. |
| 8,322,952 | B2 | 12/2012 | Tugend et al. |
| 10,259,049 | B2 | 4/2019 | Jansen et al. |
| 2007/0206998 | A1 | 9/2007 | Zollmann |
| 2008/0054575 | A1 | 3/2008 | Hartmann |
| 2009/0116912 | A1* | 5/2009 | Jansen .................. B23B 31/001 407/104 |
| 2010/0308546 | A1 | 12/2010 | Maier et al. |
| 2011/0068545 | A1 | 3/2011 | Neumeier |
| 2011/0158759 | A1 | 6/2011 | Jansen et al. |
| 2014/0227057 | A1* | 8/2014 | Haimer .................. B23B 31/201 409/234 |
| 2016/0193666 | A1* | 7/2016 | Haimer .................... B22F 5/10 279/4.03 |
| 2016/0221086 | A1* | 8/2016 | Haimer .................. B23B 31/20 |

FOREIGN PATENT DOCUMENTS

| | | |
|---|---|---|
| CN | 102133654 A | 7/2011 |
| CN | 102209600 A | 10/2011 |
| CN | 203853568 U | 10/2014 |
| DE | 29913650 U1 | 10/1999 |
| DE | 102004029047 A1 | 1/2006 |
| DE | 202009012087 U1 | 11/2009 |
| DE | 102009060678 A1 | 7/2011 |
| DE | 102009060678 B4 | 6/2015 |
| EP | 00386522 A2 | 9/1990 |
| JP | 2000246521 | 9/2000 |

* cited by examiner

INTERFACE BETWEEN A COLLET HOLDER AND A TOOL ADAPTER

With the help of collets, rotating tools can be tensioned very precisely and compactly. However, since not all tools can be tensioned in a collet, there is a need to provide a collet holder in which both collets and tool adapters for driven or stationary tools can be accommodated.

From DE 102 19 600 C5, a tool carrier with a collet holder is known, in which tool adapters can be used as an alternative to the collets. The tool adapters have a flange plate. The tool adapter is attached via said flange plate to the collet holder by means of four screws arranged on the front side of this flange plate.

From DE 10 2009 060 678 B4 of the applicant, a tool carrier with a collet holder and a tool insert for use in such a tool carrier are known. The tool carrier has an outer thread onto which a tensioning nut with an inner thread is screwed in order to secure both collets and tool adapters in the tool carrier.

A similar solution is known from DE 20 2009 012 087 U1. Here too, both the collets and the tool adapters are secured in the collet holder using a tensioning nut.

A tool tensioning device is known from DE 10 2004 029 047 A1. In this interface, an annular shoulder and a circumferential groove are formed in a tool adapter in the axial direction in front of an outer cone. A tensioning pin of the associated spindle can be screwed into the circumferential groove and in this way the tool adapter can be axially tensioned with the spindle. This solution requires additional installation space or shortens an outer cone of the tool adapter. This has a negative impact on the concentricity of a tool tensioned in the tool adapter.

An interface between a tool carrier and a tool adapter is known from DE 10 2009 042 665 A1. No collets can be inserted into this interface. In this interface, a form-locking connection is first established in the manner of a bayonet connection between the tool adapter and tool mount.

Then the connection is fixed by a targeted elastic deformation. This interface requires very small manufacturing tolerances and is therefore sensitive to wear and soiling. It is also expensive to manufacture.

These solutions known from the prior art have proven themselves in many applications; however, they have disadvantages, which are particularly important when there is little space in the work space of the machine tool for changing a tool adapter.

In the solution known from DE 102 19 600 C5, four screws have to be inserted from the end face through the flange plate and screwed into the collet holder. This means that access from the front of the collet holder is required if a tool adapter is to be used. In addition, four screws must be screwed in, in order to secure a tool adapter.

From DE 299 13 650 U1, an interface between a tool adapter and a spindle insert is known. The spindle insert has two slanting tensioning screws. The tool adapter has two longitudinal grooves and a circumferential groove with a slanted groove edge. The interaction of the tensioning screws results in a bayonet-like quick release.

From the U.S. Pat. No. 3,762,731, a collet holder is known in which a tool adapter can be pressed into the collet holder by means of the tensioning nut of the collet. In the tool adapter, a radially aligned recess is provided, which picks up a clamping bolt. The collet holder has a radially aligned internal thread with a tensioning pin. By turning the tensioning pin, the tensioning bolt is pressed against the shank of a tool enclosed in the tool adapter and the tool is held in the tool adapter. U.S. Pat. No. 4,437,801 describes a very similar system. The main difference is that the tensioning pin presses directly onto the shank of a tool enclosed in the tool adapter.

In the solutions known from the prior art with a tensioning nut, the collet holder must be secured against rotation and a key for loosening or tightening the tensioning nut must be used in order to change a collet or a tool adapter. In situations with limited space, as is often the case with Swiss-type automatic lathes, there is not enough space for this.

The invention has for its object to provide a collet holder and an associated tool adapter, which allow a tool adapter to be inserted and fixed securely and with high repeatability into a collet holder in a simple manner, even in confined spaces.

This object is achieved in an interface between a collet holder and a tool adapter, the collet holder comprising an inner cone, a flat surface, and an outer thread for a tensioning nut, wherein the tool adapter comprises an outer cone which complements the inner cone, and the collet holder has securing means, which are independent of the outer thread and the tensioning nut, for the tool adapter, in that according to the invention the independent securing means comprise one or more radially or diagonally arranged inner threads and a tensioning pin in each inner thread, and that one or more recesses which interact with the tensioning pin(s) are provided in the tool adapter.

In the solution according to the invention, the tool adapter is not secured in the collet holder by means of the outer thread of the collet holder and a tensioning nut, but rather by means of independent securing means in the form of radially or diagonally arranged tensioning pins. The tensioning pins are screwed with their tips into complementary recesses in the tool adapter.

To tension the tool adapter in the collet holder according to the invention, only a lateral or radial accessibility for a screwdriver is required. A torque support in the form of a second tool for counter-holding is not necessary in the interface according to the invention. This considerably simplifies the changing and tightening of a tool adapter according to the invention. It is also sufficient to loosen or tighten a single tensioning pin. This also saves a lot of time when changing the tool adapter compared to other known solutions.

A screwdriver is a very slim and inexpensive tool, which allows the tool adapter to be tensioned or loosened in a simple manner, even when space is limited in the machine's work area.

Because the recesses are frustoconical, but in any case are rotationally symmetrical with respect to a central axis, tensioning forces in the axial direction and torques can be transmitted via the tensioning pin and the recess. In addition, the recess can be made in the outer cone of the tool adapter; it therefore does not require any additional installation space.

The interface according to the invention is used especially when tools with small diameters and correspondingly high speeds are used. This means that the torques to be transmitted between the collet holder and tool adapter are comparatively low. Therefore, in many cases it is sufficient if the torque transmission between the collet holder and the tool adapter takes place via the tensioning pin(s).

A particularly advantageous embodiment of the invention provides that the collet holder has one or more (radial) grooves or depressions in the area of the flat surface, that the tool adapter also has one or more (radial) grooves or depressions in the area of the collar, and that a separate driver ring belongs to the interface, which has at least one form-locking element that can be inserted into the grooves or depressions in the area of the flat surface and in the area of the collar. In other words: Both the collar and the flat surfaces only have grooves or depressions. As a result, the collar and the flat surface are very simple to manufacture and can be manufactured with high precision and axial run-out.

The form-locking elements provided for precise or unambiguous positioning (and optionally also for positive torque transmission) are integrated in a driver ring designed as a separate component. If required, i.e. if a tool adapter is inserted into the collet holder, this driver ring is pushed over the outer thread of the collet holder and the tensioning pins that were previously screwed in, until the form-locking elements of the driver ring engage in the grooves of the collet holder. The tensioning pins are then positioned such that the tool adapter can be inserted into the collet holder in such a way that the grooves on the collar of the tool adapter accommodate the form-locking elements of the driver ring. This ensures precise positioning between the collet holder and the tool adapter. The tool adapter is then fixed with the help of one or more tensioning pins in the manner described above. In addition, this form-locking connection can also be used for torque transmission between the tool holder and tool adapter.

Additionally or alternatively, it is also possible that a positive torque transmission between the tool adapter and collet holder in the area of the flat surface and a collar of the tool adapter or in an area at the rear end of the inner cone of the collet holder (see claim 13) or at another location between the front and rear end is done.

The optional collar of the tool adapter does not have to be in contact with the flat surface of the collet holder. The tool adapter is then positioned and centered exclusively via the inner cone of the collet holder and the outer cone of the tool adapter.

If the collar of the tool adapter is pulled against the flat surface of the collet holder, the axial runout of the tool adapter is improved even further.

To ensure that the tool adapter can only be inserted into the collet holder in such a way that the recesses on the tool adapter interact with the tensioning pins of the collet holder, it is possible and in many cases also advantageous if, for example, the width of the grooves on the flat surface is not the same. The same applies correspondingly to the width of the grooves on the collar of the tool adapter and to the width of the form-locking elements of the driver ring according to the invention. As a result, the position in which the tool adapter can be inserted into the collet holder is structurally predetermined. As an alternative to the width of the grooves, the position in which the tool adapter must be inserted into the collet holder can also be specified by means of the groove depth and the associated dimension of the form-locking element(s) on the driver ring or via the (uneven) arrangement of the grooves and form-locking elements over the circumference of the flat surface and the collar.

The structurally predetermined positioning of the tool mount and tool adapter relative to one another ensures that the tips of the tensioning pins engage in the complementarily arranged recesses in the tool adapter when the tensioning pin(s) are tightened. Incorrect assembly is therefore impossible.

This unequal dimensioning and/or arrangement of the grooves does not cause any significant imbalance if the collet holder, the tool adapter and the driver ring are made of the same material, e.g. made of steel. As already mentioned, the tensioning is done by tightening the tensioning pin(s).

In addition, the form-locking elements can be arranged on the ring in such a way that they have a certain elasticity in the axial direction and serve as ejectors for the tool adapter.

When tensioning the tool adapter, it is pulled with its collar against the flat force of the collet holder against the spring force exerted by the form-locking elements by tightening the tensioning pin(s).

If the tool adapter is to be removed from the collet holder at a later time and the tensioning pin(s) are loosened for this purpose, the axially preloaded form-locking elements actively support the ejection of the tool adapter.

This further improves the handling of the interface according to the invention. This is particularly helpful if the inner cone and the outer cone have a slightly self-locking effect or if the inner cone and the outer cone are glued to one another by adhering cooling lubricant.

The driver ring also covers the outer thread of the collet holder and protects it from damage or dirt if no tensioning nut is screwed onto the outer thread.

In a further advantageous embodiment of the invention, the driver ring has at least one radial or diagonal through bore through which a screwdriver can be inserted in order to tighten or loosen a tensioning pin according to the invention.

The diameter of the at least one through bore in the driver ring can be so large that
a) the tensioning pin and the screwdriver fit or
b) only the screwdriver fits.

In case a), the tensioning pin can be screwed into the tool adapter and removed therefrom.

In case b), the tensioning pin cannot be removed as long as the driver ring is in place. Then the tensioning pin secures the driver ring against falling down and getting lost.

Because there is a clear spatial assignment between the grooves in the flat surface of the collet holder and the inner thread for the tensioning pins in the collet holder, it is also possible to easily design the driver ring such that the at least one through bore is positioned in the driver ring, in such way that the screwdriver, when inserted through the through bore of the driver ring, reaches the head of the tensioning pin. If there are several tensioning pins on the collet holder, the driver ring will of course have several through openings.

If, in a further embodiment according to the invention, the minimum diameter of the through bore is just large enough that a screwdriver for tightening and loosening the at least one tensioning pin can be inserted into the through bore, the driver ring also serves as a captive device for the tensioning pins. If the tensioning pin is unscrewed too far, it will hit the driver ring and cannot be unscrewed any further.

It is also advantageous if the through bore is designed as a stepped bore and the stepped bore on the inside of the driver ring has a larger diameter than on the outside of the driver ring and if the diameter of the stepped bore on the inside of the driver ring is slightly larger than the nominal diameter of the tensioning pin(s). Then the tensioning pin can be turned a bit into the stepped bore. Only when the diameter of the stepped bore is reduced, the tensioning pin hits the driver ring and cannot be unscrewed any further. In this position, the tensioning pin also serves as a captive device for the driver ring, such that a tool adapter can be replaced without the risk of the driver ring falling down from the collet holder and into the working area of the machine tool.

In addition, the driver ring according to the invention has other optional functions.

Ejecting the tool adapter can also be actively supported by loosening/unscrewing the tensioning pins. This can be achieved by a suitable design of the through bore(s) in the driver ring and/or a suitable positioning of the through bore(s) in the driver ring relative to the inner thread(s) in the collet holder. The result of both alternatives is that, by loosening the tensioning pin(s), an axial force is indirectly exerted by the tensioning pin(s) on the driver ring on the tool adapter, said axial force supporting the ejection.

If, for example, the through bore or a chamfer or rounding of the through bore in the driver ring is arranged offset in the axial direction to the tensioning pin, then the tensioning pin hits axially offset against an edge or a chamfer at the transition from the inner larger diameter to the smaller diameter of the through bore. This offset pressing of the tensioning pins causes the tool adapter to be ejected, or at serves as an aide therefor.

Alternatively, the inner section of the through bore can be formed with a larger diameter than the cone, which is slightly offset in the axial direction from the longitudinal axis of the inner thread.

Alternative configurations of form-locking connections provide that the collet holder has one or more projections in the area of the flat surface and the tool adapter in the area of the collar has one or more recesses or depressions complementary to the projections.

Alternatively, it is also possible for the tool adapter to have one or more projections in the region of the collar and for the collet holder to have recesses or depressions which are complementary to the projections in the region of the flat surface. These projections can also be inserted sliding blocks or inserted pins. In these alternatives, an driver ring is not necessary.

Alternative or additional configurations provide that the tool adapter and the collet holder can be connected in a form-locking manner to one another at an end of the inner cone opposite the flat surface. Such a form-locking connection can be, for example, a polygon connection between the tool adapter and the collet holder.

As an alternative or in addition, it is also possible for a plurality of axial grooves to be formed in the collet holder or in the tool adapter and for these axial grooves to interact with projections on the tool adapter or the collet holder in the sense of a positive torque transmission.

Another alternative provides for the torque to be transmitted by means of a claw coupling between the collet holder and the tool adapter.

The functions "positioning of tool mount and tool adapter" and "torque transmission from the tool mount to the tool adapter" can be realized by the form-locking connection in the area of the flat surface and the collar or by the form-locking connection at the opposite end of the tool mount.

However, it is also possible that the "positioning tool mount and tool adapter" function is realized by the form-locking connection in the area of the flat surface and the collar, and the "torque transmission from the tool mount to the tool adapter" function is implemented at the opposite end of the tool holder. The reverse assignment of functions is also possible.

This "division of tasks" is realized constructively by means of the rotational free play and the arrangement in the axial direction of both form-locking connections. The form-locking connection with the larger rotational free play is positioned in the axial direction such that it becomes active when the tool adapter is inserted and takes over the positioning; the other form-locking connection takes over the "torque transmission" function.

It has also been found to be particularly advantageous if a nominal diameter of the outer thread for the tensioning nut is at least 1.4 times larger, preferably 1.5 times to 1.8 times larger, than the largest diameter $D_{max}$ of the inner cone.

With increasing wall thickness of the collet holder between the inner cone and the outer thread, the inner thread becomes longer, such that the resilience thereof increases. In addition, the tensioning pin(s) can have a longer design, which means that the tensioning pins can better absorb the lateral forces that occur when the tool adapter is tensioned. This also results in a very strong and stable collet holder.

The interface according to the invention can be integrated in a driven tool mount, in particular a driven tool mount for Swiss-type automatic lathes, or a stationary tool mount.

In a further development of the interface according to the invention, there are several grooves on the outer cone of the tool adapter. The grooves preferably run in the circumferential direction. These grooves can generally run anywhere on the outer cone; for example in the axial direction. However, circular or spiral designs are preferred for manufacturing reasons. These grooves provide a small storage volume when inserting and tensioning the tool adapter into the spindle, which hold the cooling lubricant present in the area of the inner cone of the spindle and the outer cone of the tool adapter. Assuming the same tensioning force, this significantly reduces the thickness of the film of cooling lubricant on the contact surface between the inner cone of the spindle and the outer cone. As a result, the concentricity of the tool adapter is further improved.

When arranging the grooves, it is important to make sure that they stop in good time at least before one of the two cone ends in order to create a sufficient sealing area without interruption. This sealing area is necessary such that cooling lubricant cannot accidentally escape from the interior of the tool holder through the spiral groove.

In a further advantageous embodiment of the invention, the tensioning pin(s) have a frustoconical tip. Additionally or alternatively, it is also possible for the tensioning pin(s) to have a tip arranged eccentrically to an outer thread of the tensioning pin. This tip can be frustoconical or cylindrical. Then the tensioning pin works as an eccentric tensioning pin.

Further advantages and advantageous embodiments of the invention can be found in the following drawings, the description thereof and the claims. All of the features described in the drawing, the description thereof and the claims can be essential to the invention both individually and in any combination with one another.

DRAWINGS

Figure 1B:
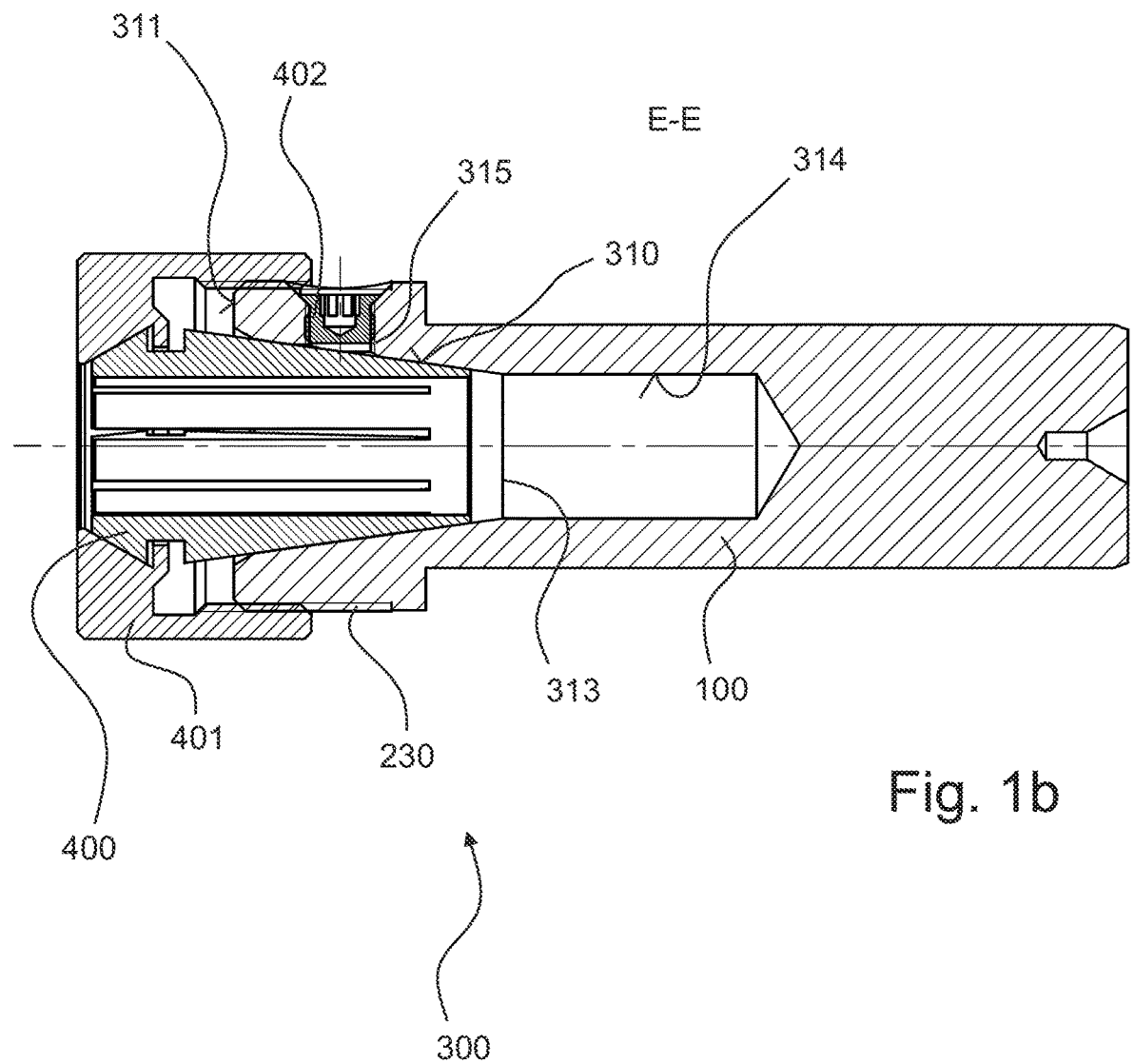
Figure 2:
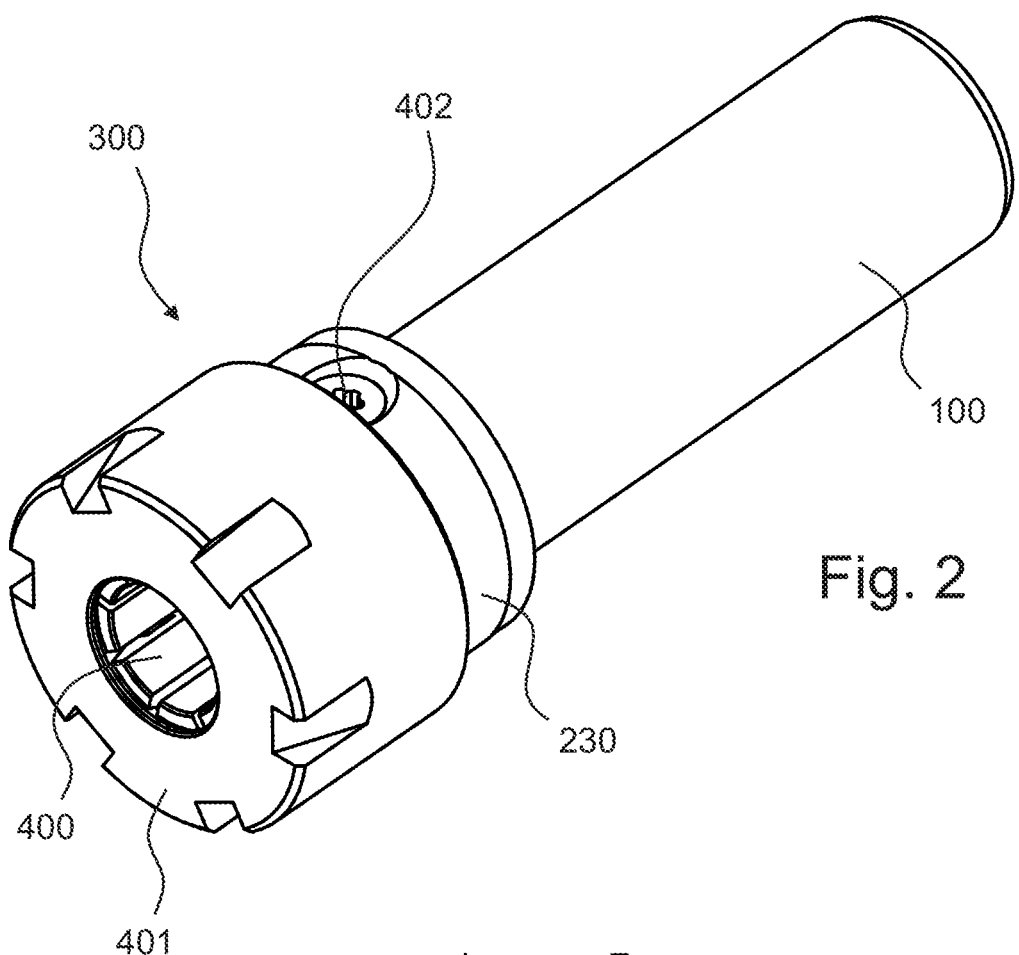
Figure 3:
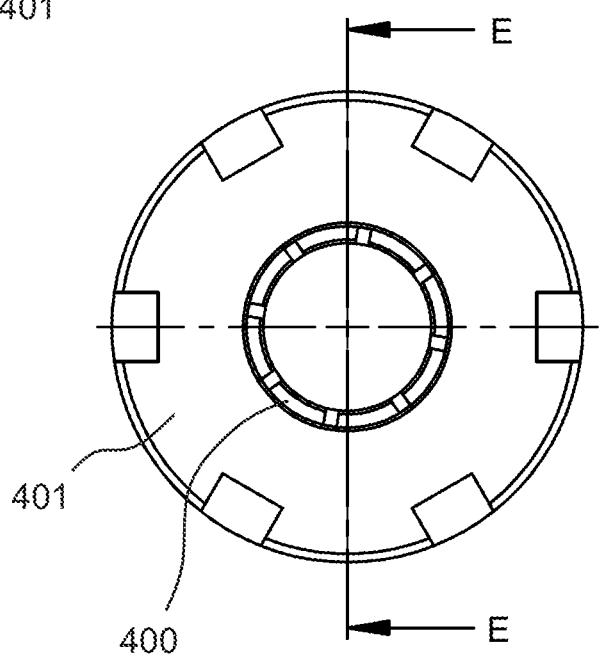
Figure 4:
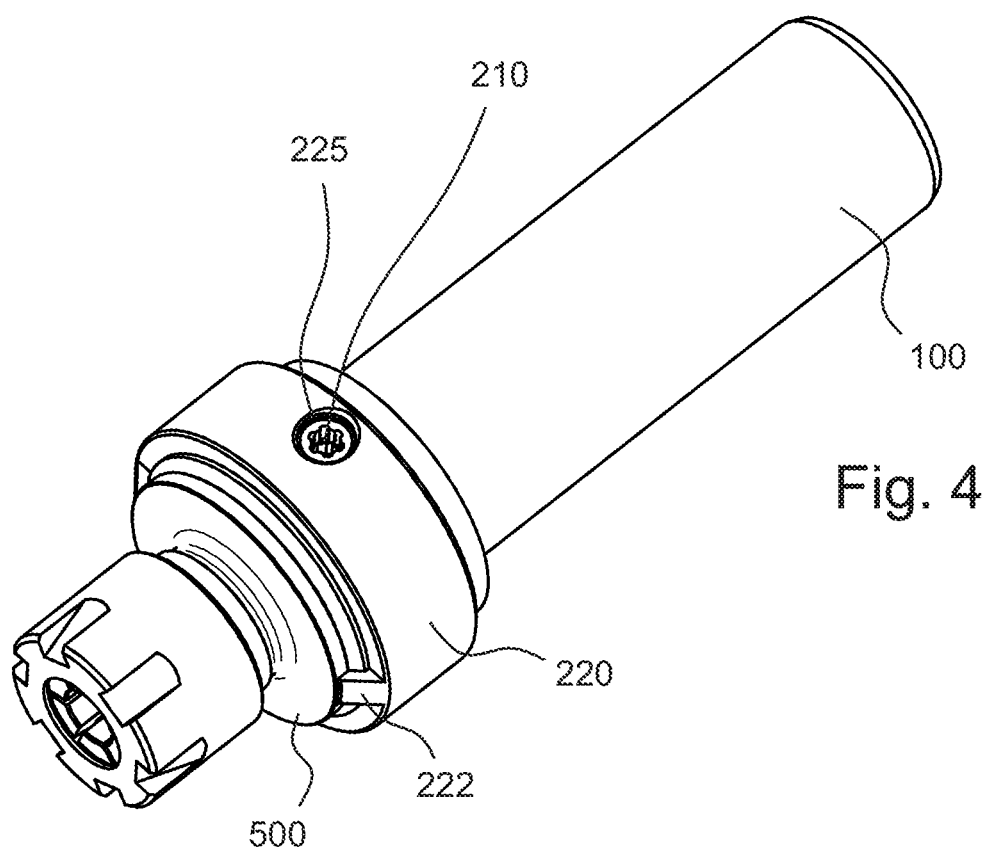
Figure 5:
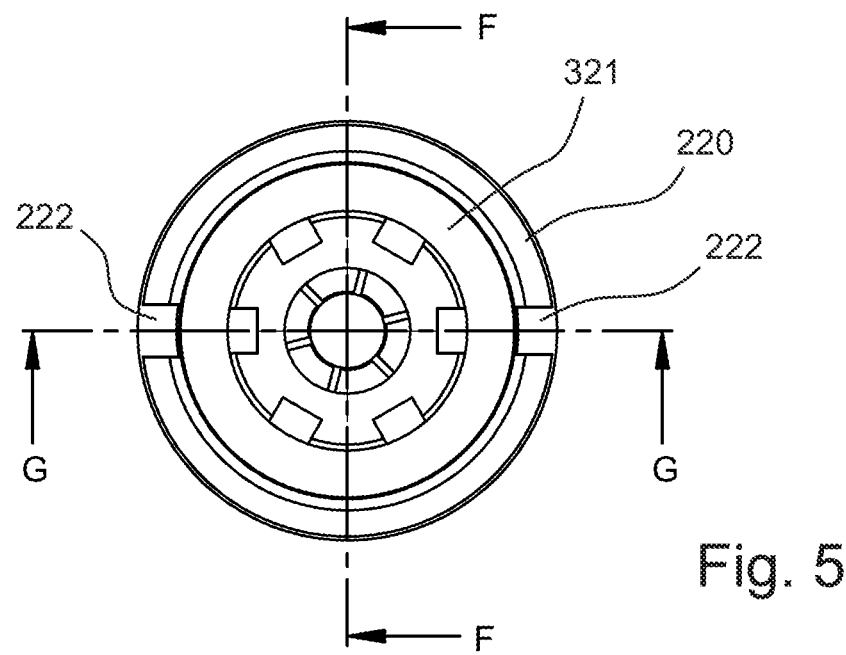
Figure 6:
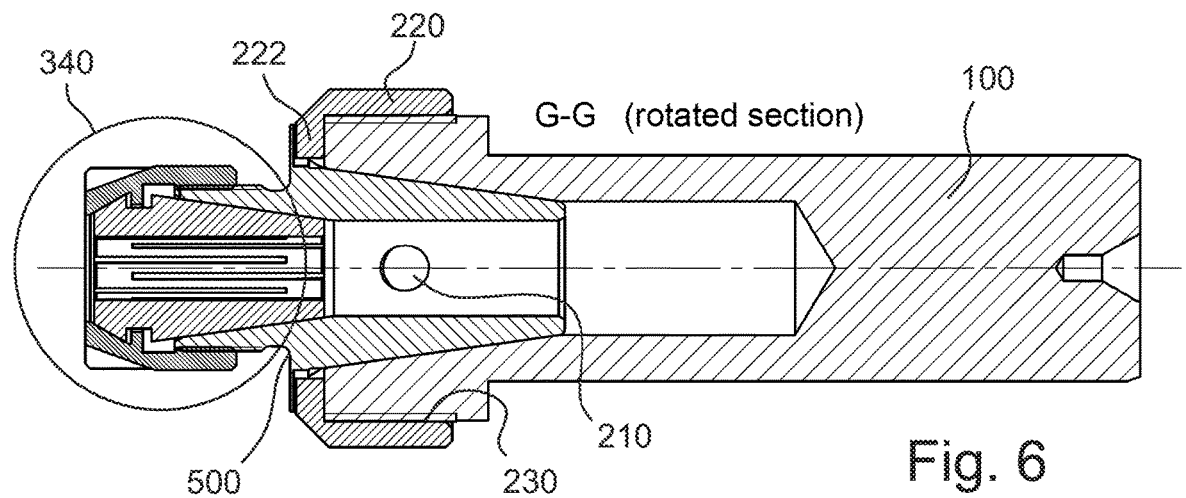
Figure 7:
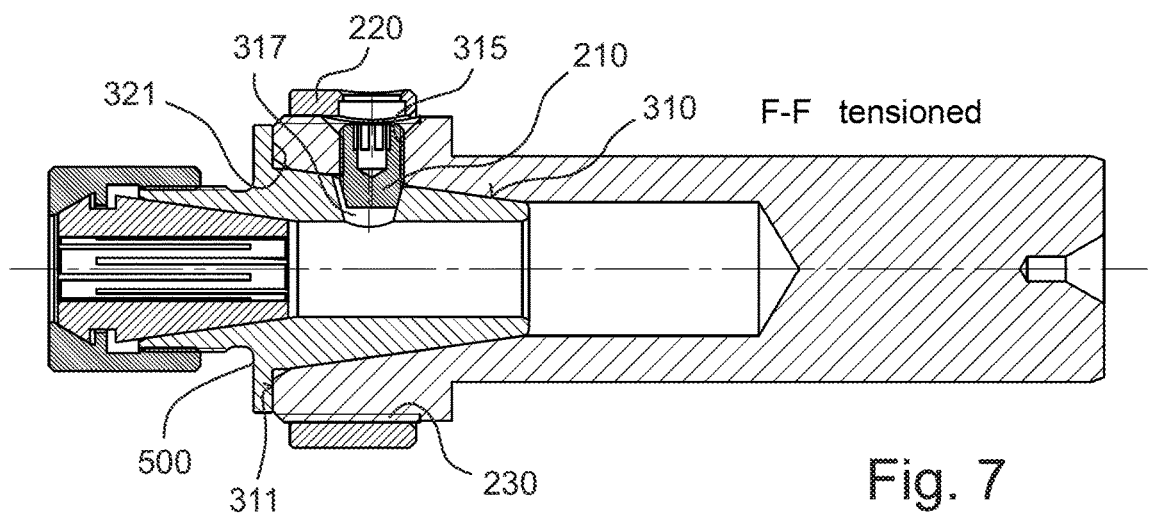
Figure 8:
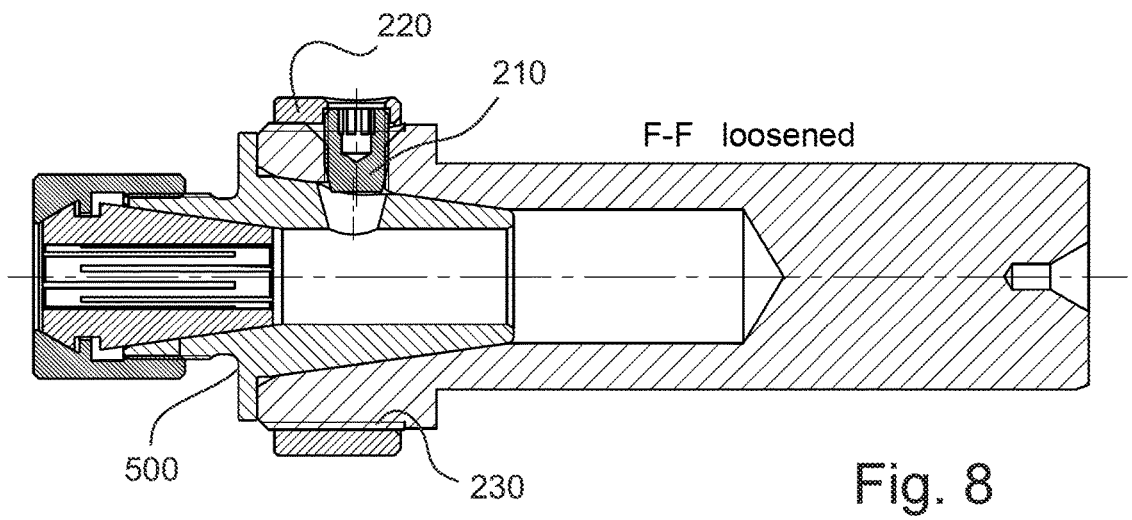
Figure 9:
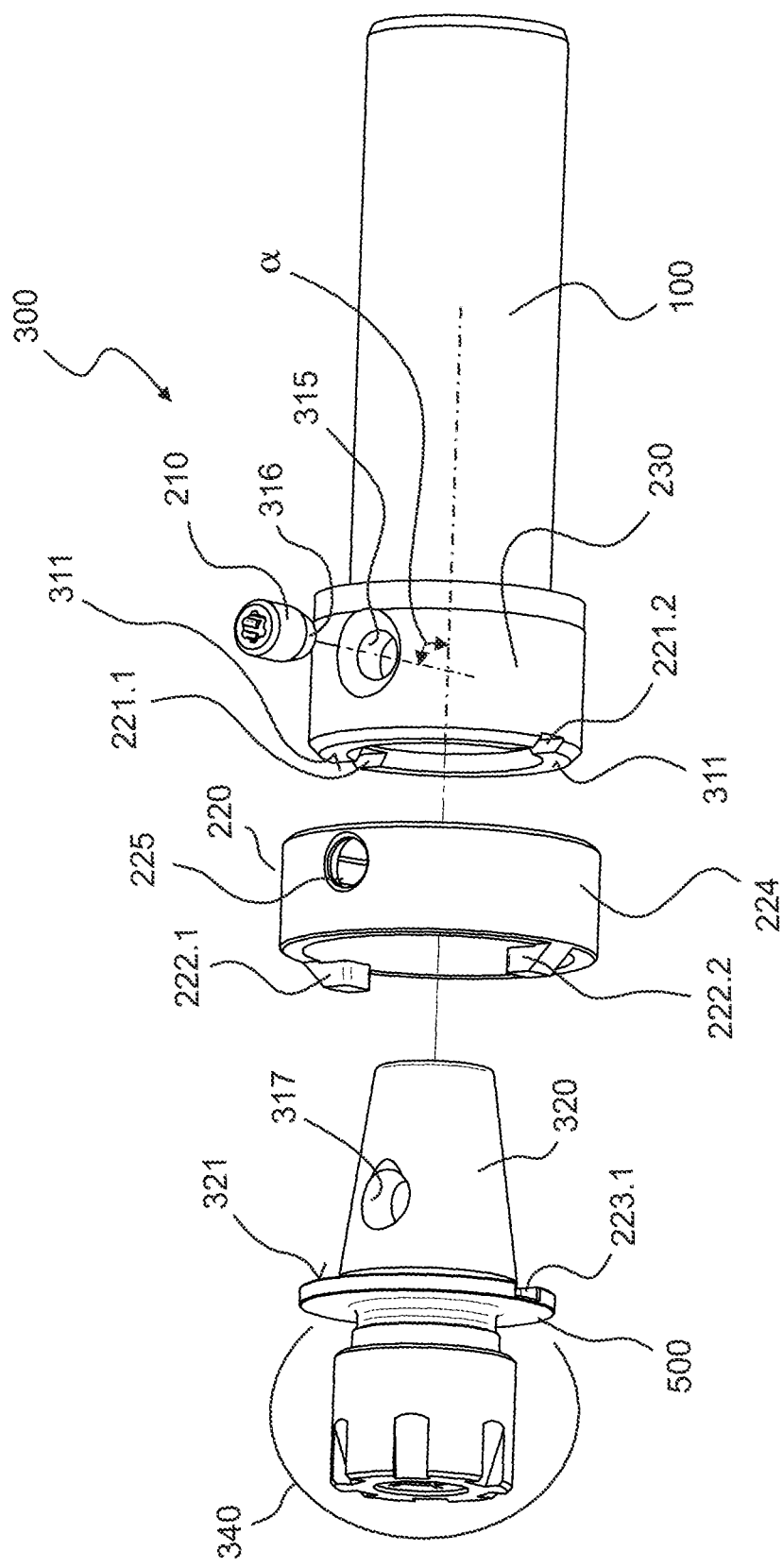
Figure 10:
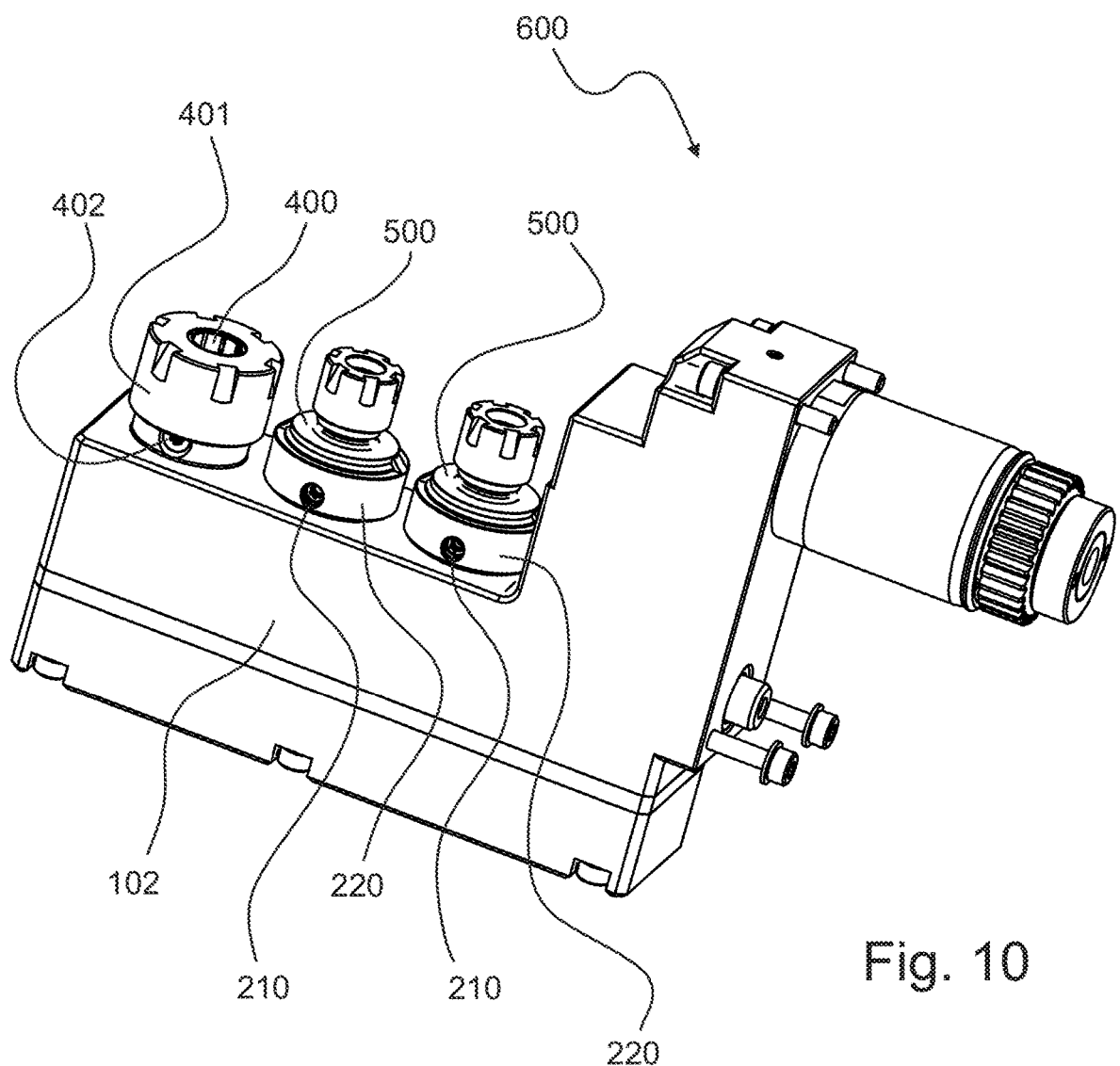
Figure 11:
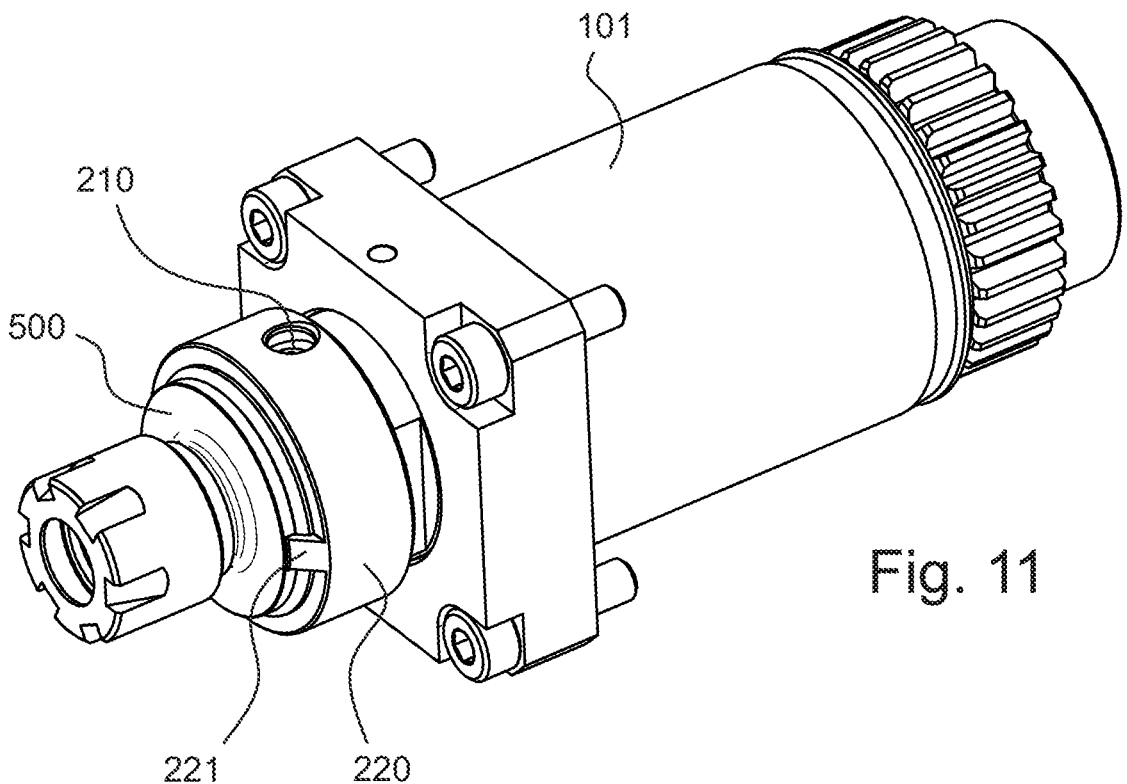
Figure 12:
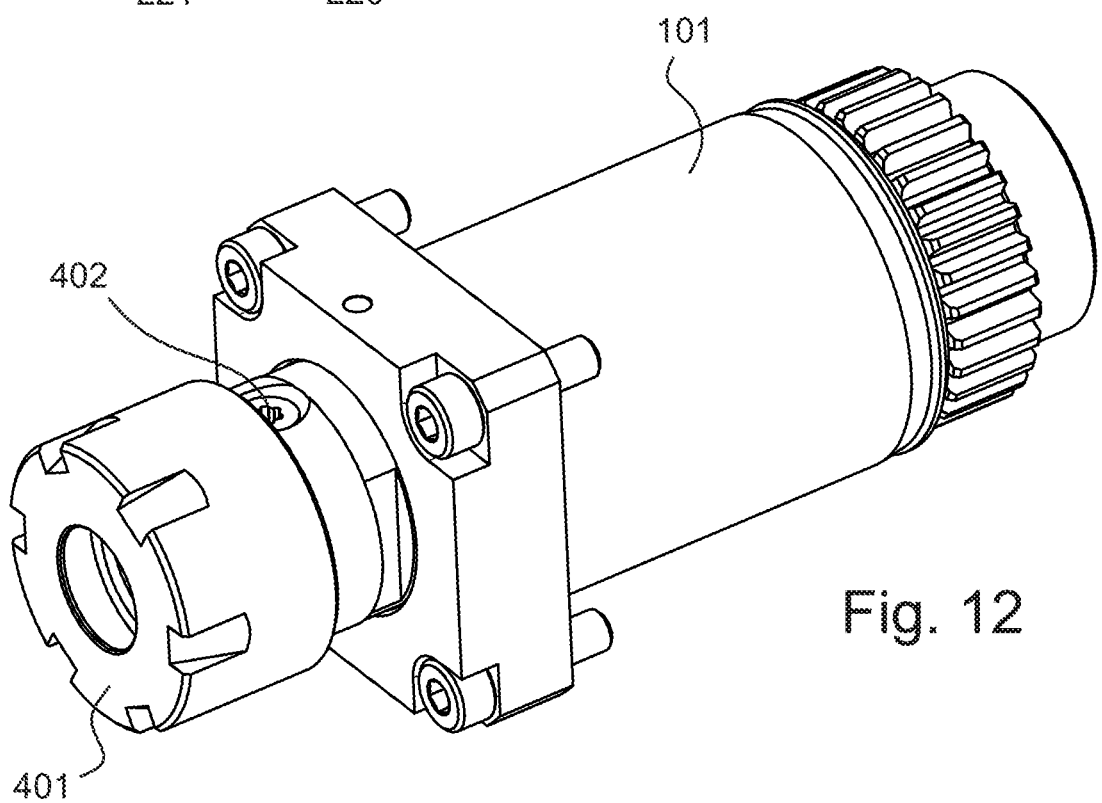
Figure 13:
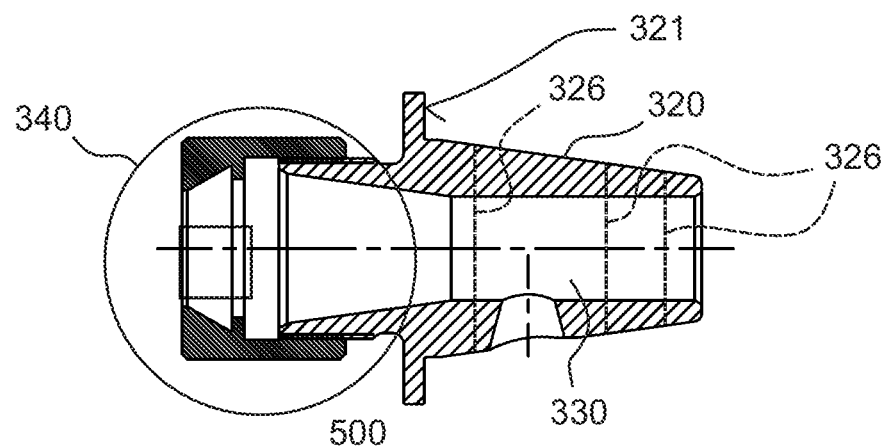
Figure 14:
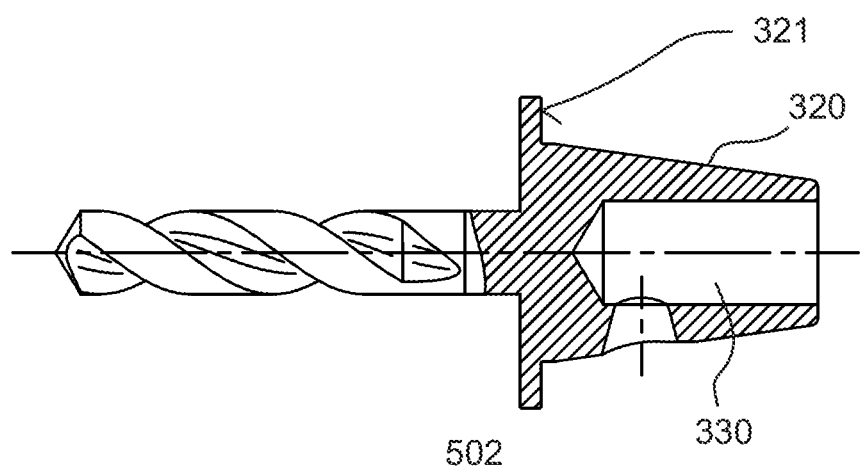
Figure 15:
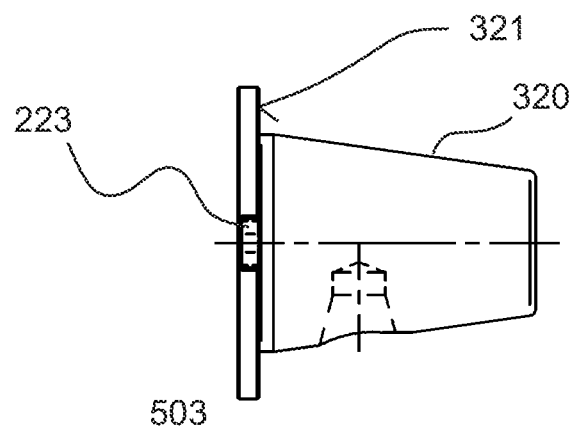
Figure 16:
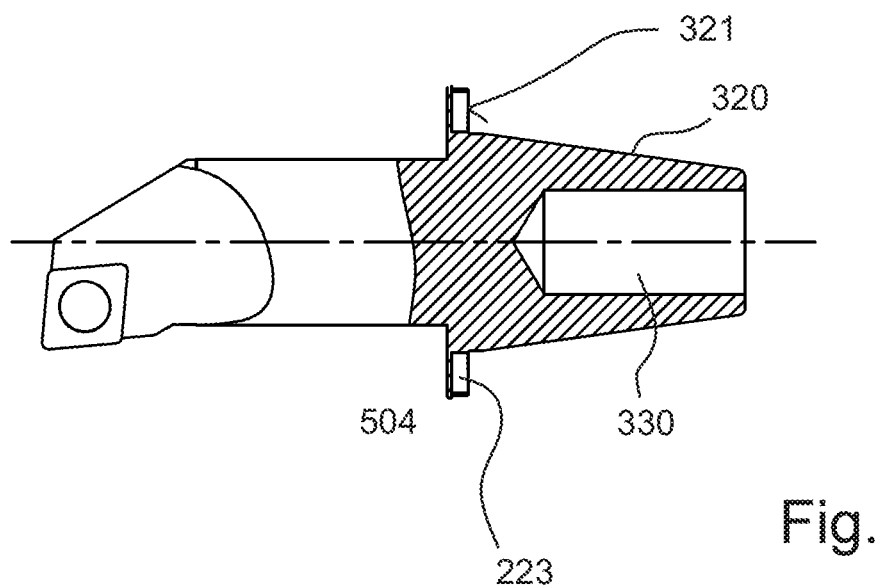
Figure 17:
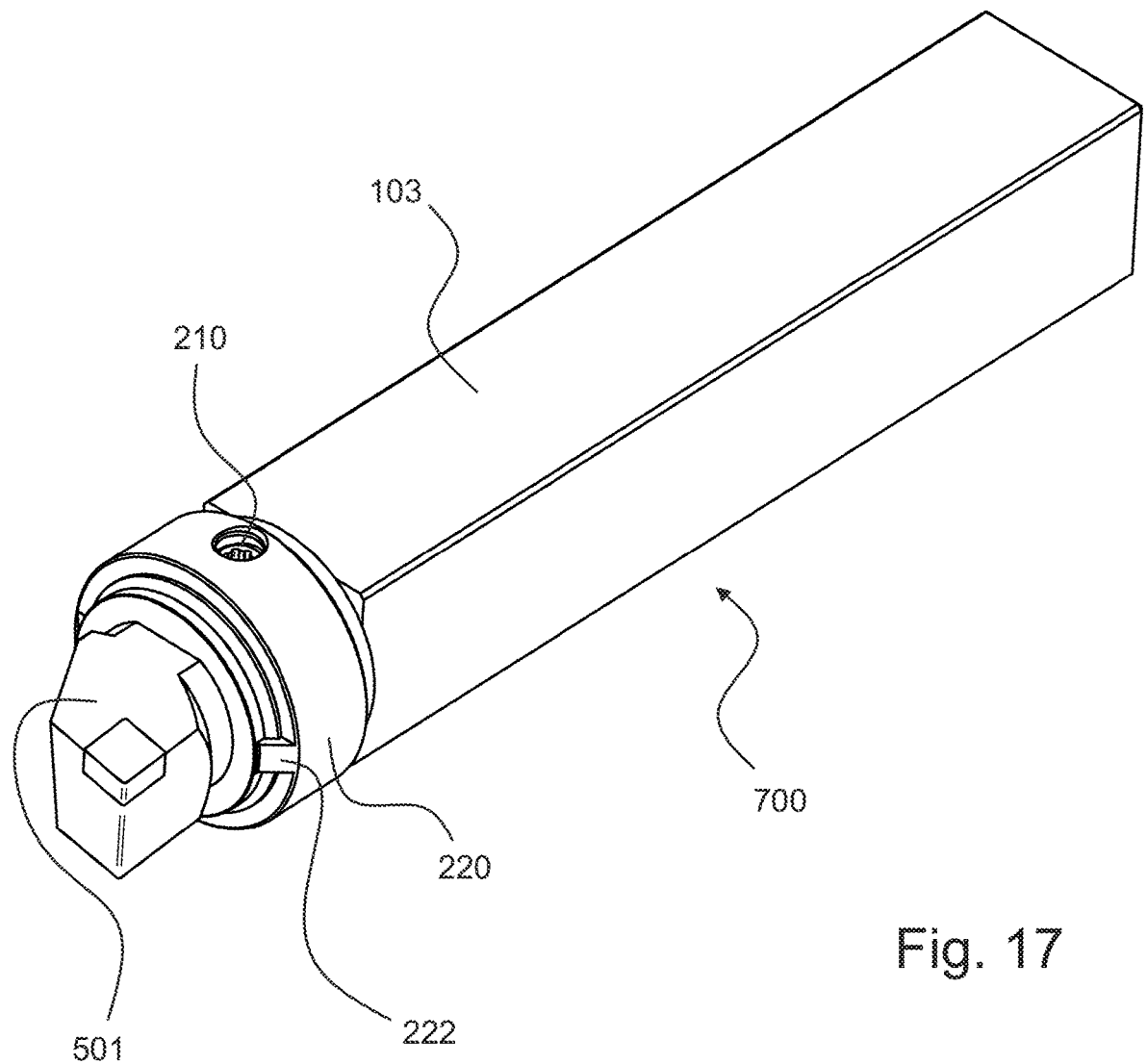
Figure 18:
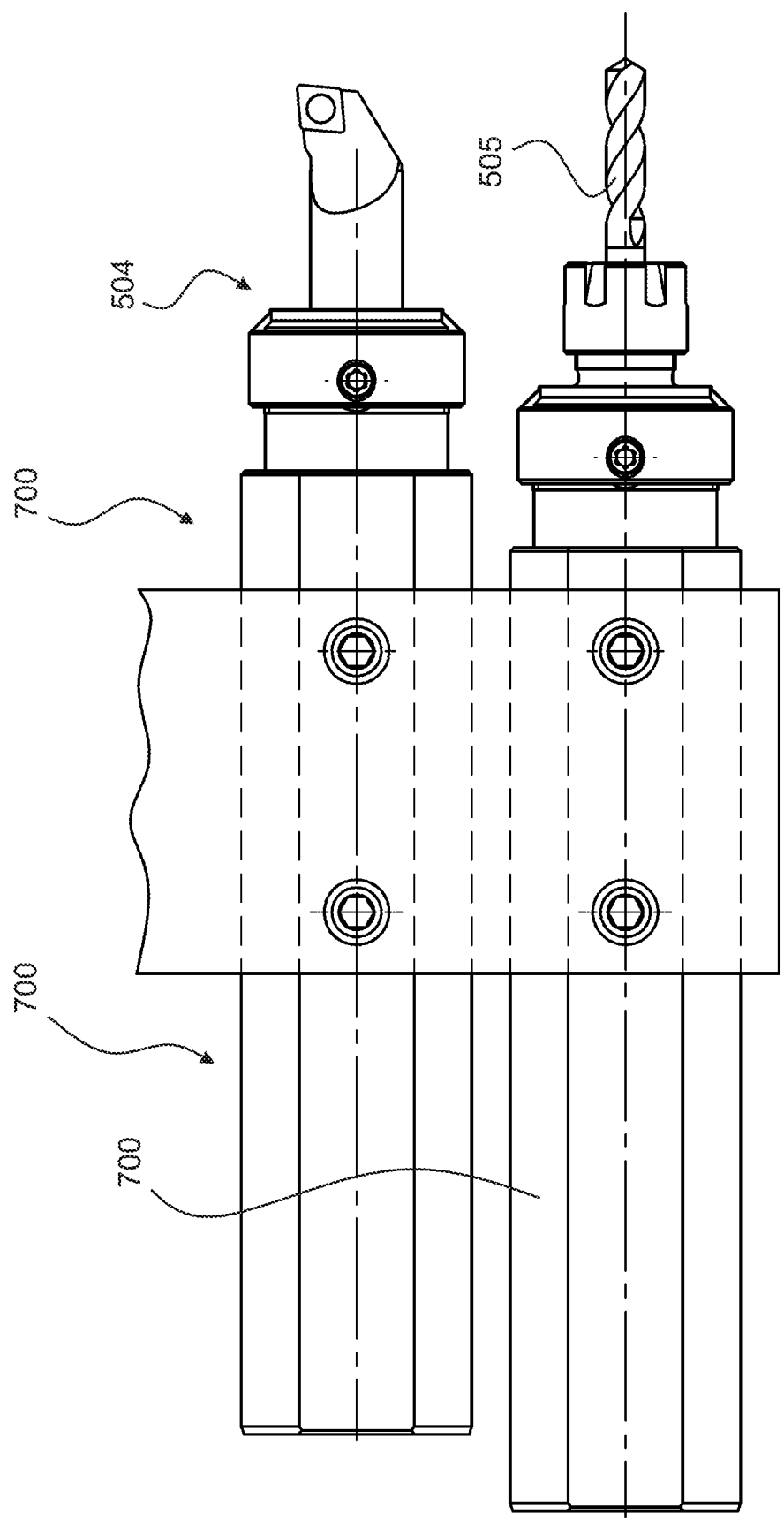
Figure 19:
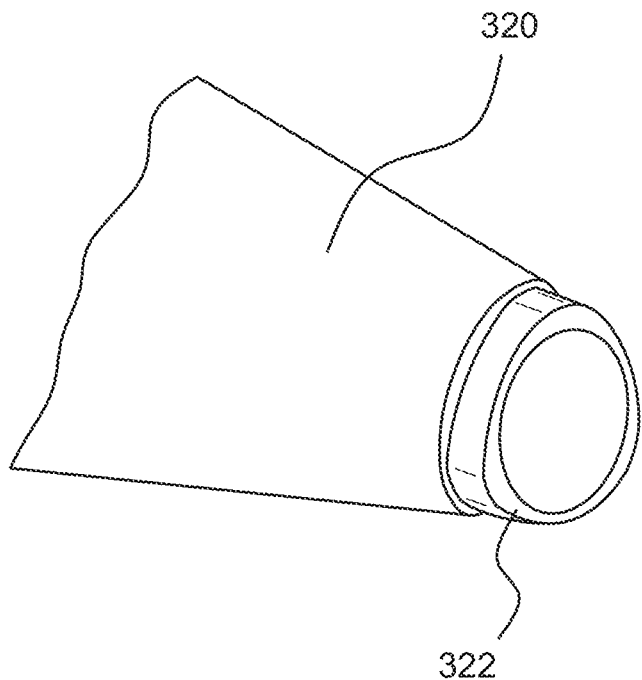
Figure 20:
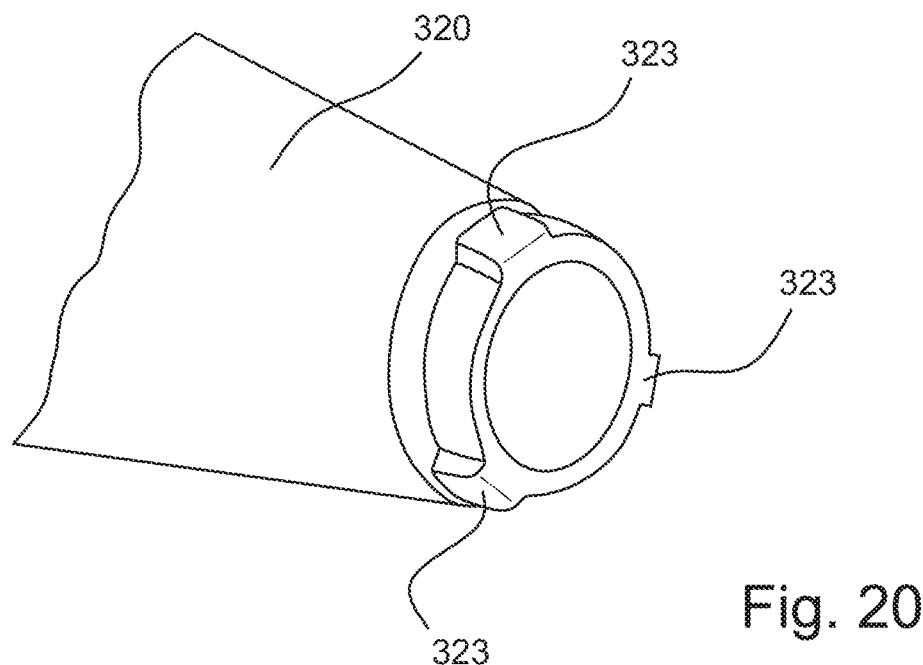
Figure 21:
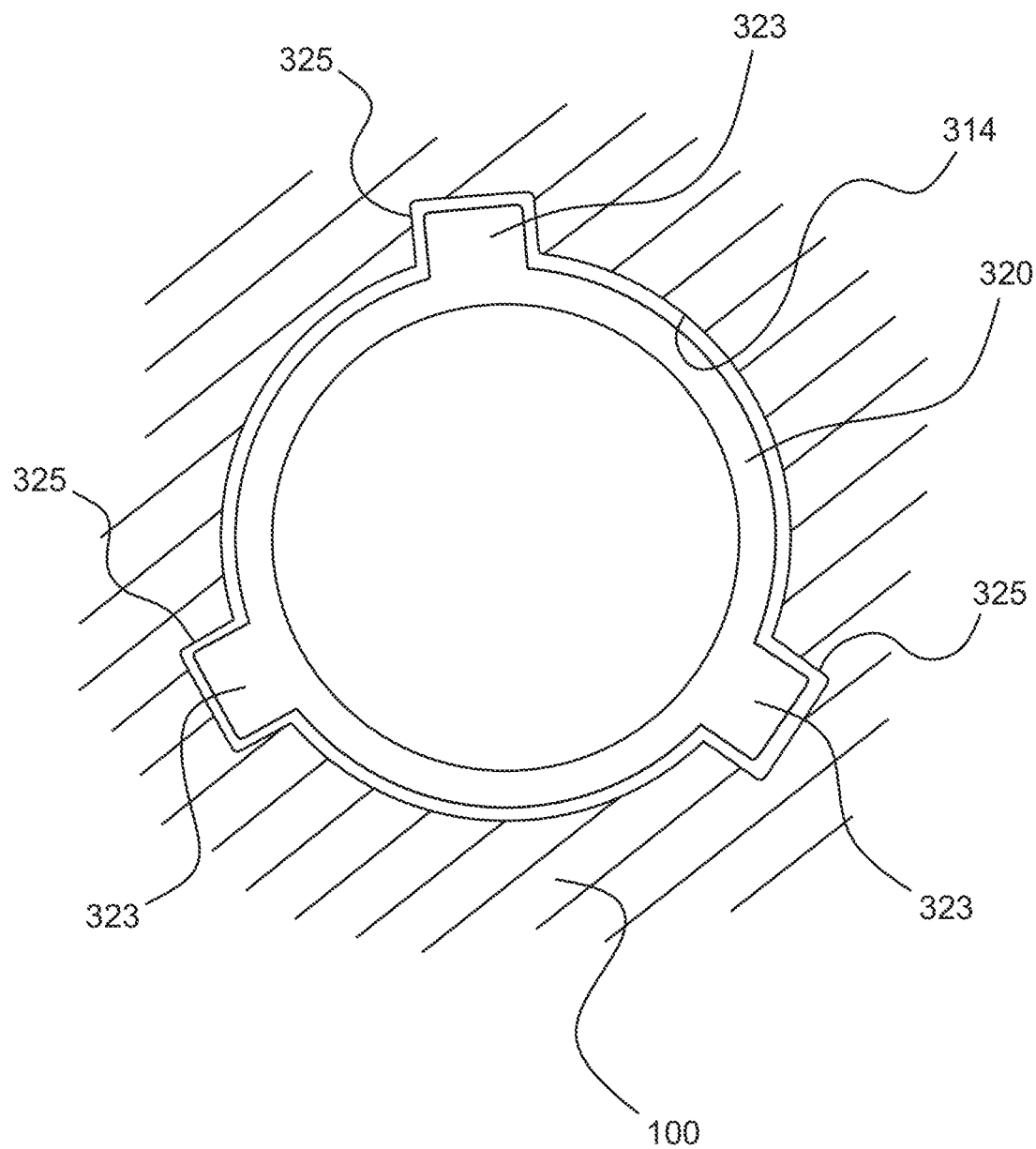
Figure 22:
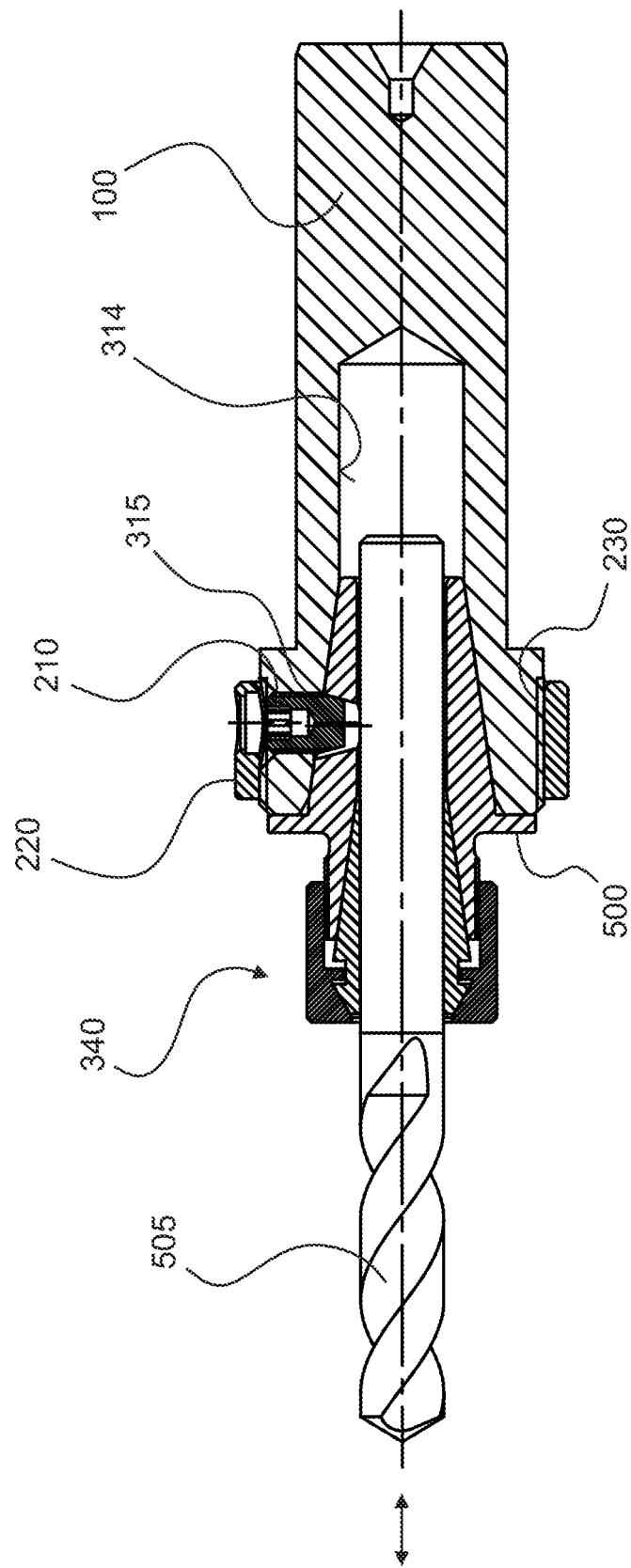
Figure 23:
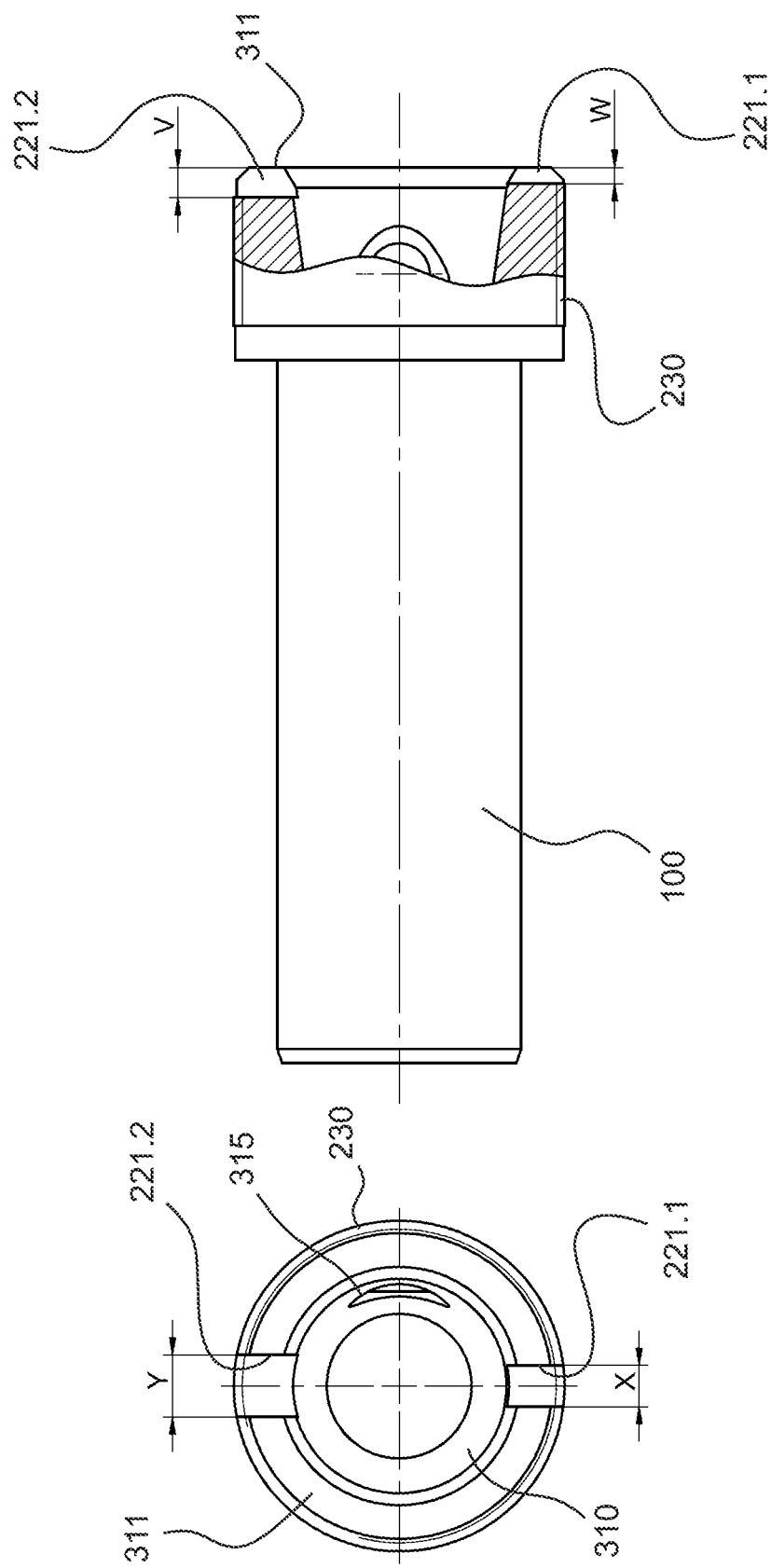
Figure 24:
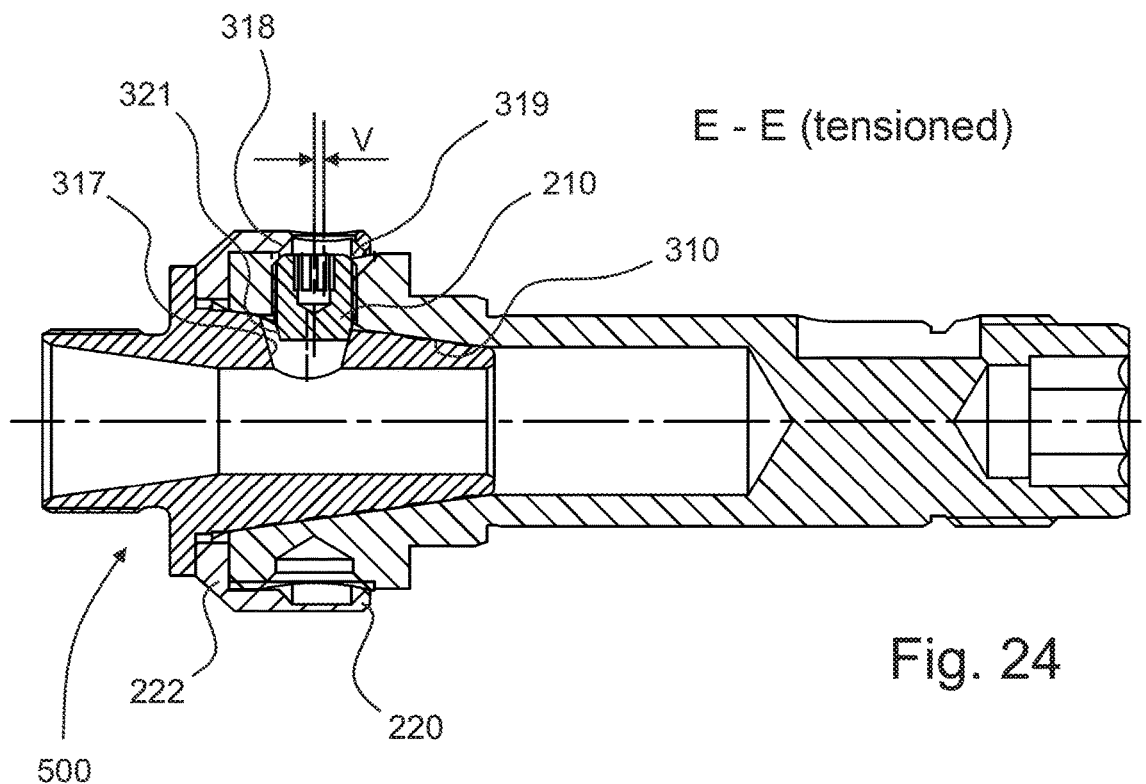
Figure 25:
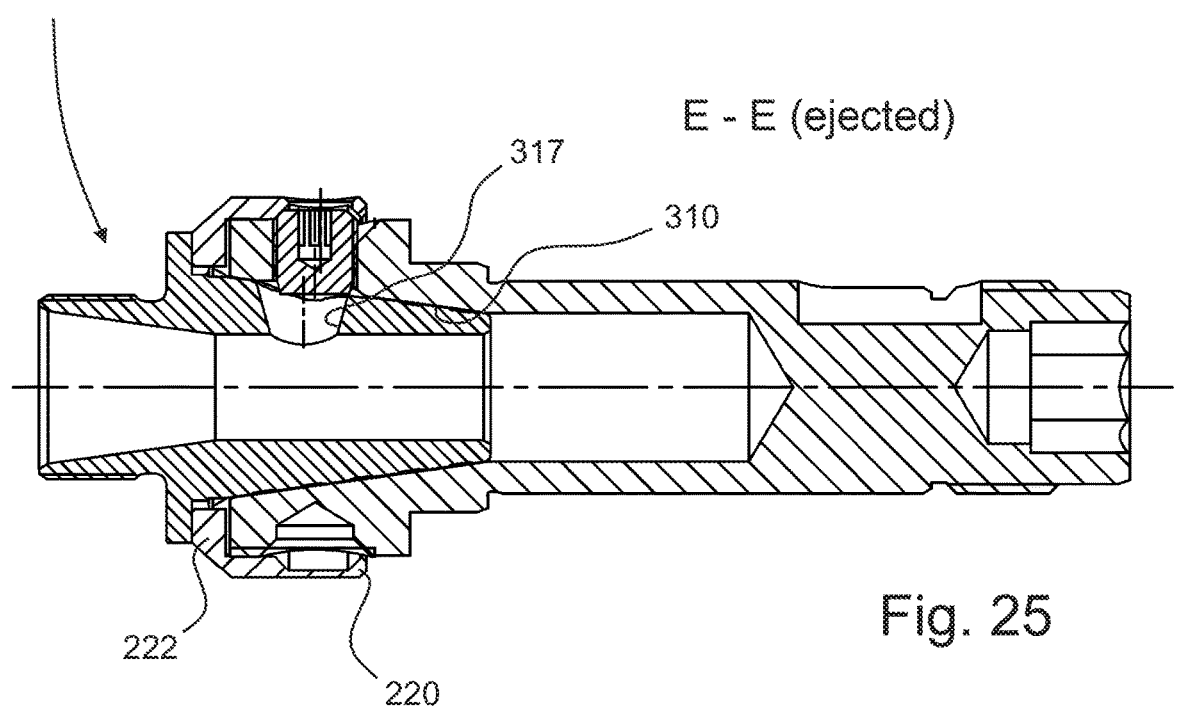

In the drawings:

FIG. 1a: shows a section E-E through a tool holder with a collet holder according to the invention without collet and without tensioning nut;

FIG. 1b: shows a section E-E through a tool holder with a collet holder according to the invention with collet and tensioning nut;

FIG. 2: shows a perspective view of the tool holder from FIG. 1b;

FIG. 3: shows a side view of FIG. 1b;

FIG. 4: shows a perspective view of the tool holder with a tool adapter according to the invention from FIGS. 6, 7, and 8;

FIG. 5: shows a side view of FIGS. 6, 7, and 8;

FIG. 6: shows a section G-G (rotated) through a tool holder with a tool adapter;

FIG. 7: shows a section F-F through a tool holder with a tool adapter having the tensioning pin 210 in the tensioned position;

FIG. 8: shows a section FF through a tool holder with a tool adapter having the tensioning pin 210 in the released position;

FIG. 9: shows an exploded view of the tool holder with tool adapter from FIGS. 6, 7, 8;

FIG. 10: shows a driven, angled tool mount, with 3 tool holders, once equipped with a collet according to FIG. 1b and twice equipped with tool adapters according to FIGS. 6, 7 and 8;

FIG. 11: shows a driven straight tool mount with a tool holder and equipped with a tool adapter according to FIGS. 6, 7, and 8;

FIG. 12: shows a driven straight tool mount with a tool holder and equipped with a collet and with a tensioning nut according to FIG. 1b;

FIG. 13: shows a tool adapter according to the invention with a tool holder, shown here as an example with a collet holder;

FIG. 14: shows a tool adapter according to the invention with an integrated cutting tool, shown here by way of example as a drill;

FIG. 15: shows a tool adapter designed as a plug;

FIG. 16: shows a tool adapter according to the invention with an indexable insert holder for turning operations;

FIG. 17: shows a tool mount according to the invention, here as a square recess with integrated tool holder, equipped with a tool adapter for indexable inserts;

FIG. 18: shows two tool mounts according to the invention, here as cylindrical receptacles with integrated tool holder, equipped once with the tool adapter from FIG. 13 and once with the tool adapter from FIG. 16;

FIG. 19: shows a polygon for torque transmission on a tool adapter according to the invention, and FIG. 20: shows another embodiment of the torque transmission on a tool adapter according to the invention, FIG. 21: shows the interaction of the torque transmission on an inventive tool adapter according to FIG. 21 and a collet holder according to the invention in cross section, FIG. 22: shows a tool adapter according to the invention with a collet holder for tensioning a tool, as well as a tool and a spindle in longitudinal section, FIG. 23: shows a spindle in two views, FIG. 24: shows a section similar to FIG. 7 through another embodiment with the tensioning pin 210 in the tensioned position; and FIG. 25: shows a section similar to FIG. 24 in which the tensioning pin 210 takes over the pressing of the tool adapter.

DESCRIPTION OF THE EMBODIMENTS

FIGS. 1a, 1b, 2 and 3 show an embodiment of a collet holder 300 according to the invention, which is integrated in a spindle 100. The spindle 100 can, for example, be integrated in a driven tool mount according to FIGS. 10, 11, and 12. With driven tool mounts, the spindle is rotatably mounted in the tool mount and rotates during machining.

Alternatively, it is also possible for the spindle to be integrated in a fixed tool mount or to be designed as a fixed tool mount, as is illustrated with reference to FIGS. 17 and 18 and will be explained in more detail below.

The actual collet holder 300 is located in FIGS. 1a and 1b at the left end of the spindle 100. The collet holder 300 according to the invention comprises an inner cone 310, a flat surface 311 and an outer thread 230. The inner cone 310 can correspond to DIN ISO 15488, such that standardized collets 400 can be used in the collet holder 300 according to the invention.

A tensioning nut 401 is screwed onto the outer thread 230 of the spindle 100 in a manner known per se (see FIG. 1b). When the tensioning nut 401 is tightened, it presses a collet 400 (see FIG. 1b) into the inner cone 310. As a result, a tool with its cylindrical shank (not shown in FIGS. 1 to 3) is tensioned in the collet 400.

The inner cone 310 has a front end 312 and a rear end 313. In FIGS. 1a and 1b, the front end 312 is arranged on the left. At the front end 312, the inner cone 310 has its largest diameter $D_{max}$.

At the rear end 313, the inner cone has its smallest diameter $D_{min}$. In this exemplary embodiment, the inner cone 310 merges into a cylindrical bore 314 at 313. The optional cylindrical bore 314 makes it possible to push the shank of a tool tensioned in the collet 400 (not shown) through the collet 400 in the direction of the cylindrical bore 314. As a result, the axial distance between the cutting edge(s) of the tool and the flat surface 311 can be set. The aim is to keep this distance as small as possible in order to achieve the most rigid possible tensioning of the tool. This improves the machining accuracy, the possible cutting performance and the service life of the tool. In the configuration shown in FIGS. 1 to 3, the axial distance between the cutting edge(s) of the tool and the flat surface 311 can only be set in the working space of the machine tool. This is undesirable because it leads to relatively long unproductive downtimes of the machine tool and the repeatability of the setting is low.

The outer thread 230 has a nominal diameter $D_{nenn}$ which is significantly larger than the diameter $D_{max}$ at the front end 312 of the inner cone 310. In practice, it has proved advantageous if the nominal diameter $D_{nominal}$ of the outer thread 230 is at least greater by a factor of 1.4 than the maximum diameter $D_{max}$ of the inner cone 310. Then the wall thickness between the outer thread 230 and the inner cone 310 is sufficient to provide a radially or diagonally running inner thread 315 into which a screw plug 402 or a tensioning pin 210 can be screwed. The inner thread has a frustoconical countersink (without reference numeral) at its radial outer end.

As an alternative to the radial course shown, the inner thread 315 can also run obliquely (not shown), such that the longitudinal axes of the inner cone 310 and the inner thread 315 enclose an angle α greater than 90°, preferably 105° or 120°.

A locking screw 402 is screwed into the inner thread 315 when a collet 400 and a tensioning nut 401 are used for tensioning a tool.

The locking screw 402 has a frustoconical upper end which, together with the conical countersinking of the inner thread 315, seals the inner thread 315. This prevents cooling lubricant, which is supplied to a tool tensioned in the collet 400, from getting into the environment in an uncontrolled manner through the inner thread 315. In addition, the inner thread 315 is protected against damage or contamination by the screw plug 402.

In FIGS. 2 and 3, the spindle is shown in different views. The screw plug 402 can be clearly seen in FIG. 2. The outer thread 230 is not illustrated in FIG. 2. Instead, only a cylindrical surface is provided with the reference symbol 230. The collet holder 300 according to the invention of the spindle 100 works in the configuration shown in FIGS. 1b to 3, like a conventional collet holder according to DIN ISO 15488 with a tensioning nut.

A second configuration is shown in different views in FIGS. 4 to 9. In this configuration, instead of a collet 400 and a tensioning nut 401, a tool adapter 500 according to the invention is inserted into the inner cone 310 of the collet holder 300.

FIG. 9 shows this configuration in an exploded view. A tensioning pin 210 is inserted into the inner thread 315 of the collet holder 300. In the illustrated embodiment, the inner thread 315 is arranged radially. This means that the longitudinal axis of the inner thread 315 runs radially and orthogonally to the longitudinal axis of the spindle 100. It is also possible that an angle α between the longitudinal axis of the inner thread 315 and the longitudinal axis of the spindle 100 is different from 90°. For example, the angle could not be 90°, as shown in FIG. 9, but rather 105° or 120°.

The tensioning pin 210 has a truncated cone 316 at one end in this exemplary embodiment. A driver for a screwdriver is formed at the opposite end of the tensioning pin 210. At the left end of the spindle 100 in FIG. 9, the flat surface 311 is clearly visible. The flat surface 311 interacts with a collar 321 of a tool adapter 500.

Grooves 221 and 223 are formed both in the flat surface 311 and in the collar 321, which can also be referred to as recesses. In this exemplary embodiment, the grooves 221 and 223 run radially and are arranged such that the grooves 221 and 223 are opposite one another when the tool adapter 500 is inserted into the spindle 100.

Because there are no projections on both the flat surface 311 and the collar 321, the collar 321 and the flat surface 311 can be produced very simply and precisely. For example, both surfaces can be produced by grinding in order to be exactly flat and at right angles to the longitudinal axis of the spindle 100 or the tool adapter 500. It is also possible to provide the flat surface 311 and/or the contact surface of the collar 321 interacting therewith with a hollow grinding. As a result, the contact area between collar 321 and flat surface 311 is reduced to an annular area and there is a certain elasticity between the spindle 100 and the tool adapter 500 in the axial direction, such that the tool adapter 500 is drawn into the inner cone 310 in the axial direction by tightening the tensioning pin 210 against the preload resulting from the slight elastic deformation.

If the tensioning pin 210 is released to release the connection between the tool adapter and the collet holder 300, the tool adapter 500 springs back again and the connection is released. This axial deformation is usually less than 0.03 mm.

An driver ring 220 according to the invention is provided between the spindle 100 and the adapter 500. The driver ring 220 comprises two form-locking elements 222, which are compatible with the grooves 221 in the flat surface 311 and the grooves 223 in the collar 321. Compatible in this context means that the form-locking elements 222 immerse both in the grooves 221 and in the grooves 223 when the driver ring 220 is placed on the spindle 100 and the tool adapter 500 is inserted into the tool holder or the spindle 100.

The driver ring 220 comprises a tubular section 224, which connects the form-locking elements 222 to one another and also serves as a cover for the outer thread 230. A through bore 225 is formed in the tubular portion 224. The through bore 225 is positioned such that it lies over the inner thread 315 or the tensioning pin 210 when the form-locking elements 222 of the driver ring 220 are inserted into the grooves 221 of the spindle 100 or the collet holder 300. If the spindle 100 only has an inner thread 315 and only one tensioning pin 210, then it is particularly advantageous if the grooves 221.1 and 221.2 differ, for example, in width or depth. In a corresponding manner, the form-locking elements 222.1 and 222.2 are then of different widths or depths (see also FIG. 23 and the description thereof). This ensures that the driver ring 220 can only be installed in one position, and in such a way that the through bore 225 is located above the inner thread 315 or the tensioning pin 210.

The same applies to the form-locking elements 222.1 and 222.2 and the grooves 223.1, 223.2 in the collar 321. Only one groove 223.1 is visible in FIG. 9. The groove 223.2 arranged opposite is covered by the collar 321.

FIGS. 4 and 5 show the exemplary embodiment as shown in FIG. 9 in the assembled state. It is clear from FIG. 4 that the driver ring 220 covers the outer thread 230 of the spindle 100 or the collet holder 300. The through bore 225 releases the tensioning pin 210 to such an extent that a screwdriver (not shown) can be inserted into the driver element of the tensioning pin 210 and the tensioning pin 210 can be rotated.

FIG. 5 shows a side view of the configuration according to FIG. 4.

FIG. 6 shows a section along the line G-G through the spindle 100, the tool adapter 500 according to the invention, and the driver ring 220. In this illustration, the form-locking between the spindle 100 and the tool adapter 500 can be clearly seen with the aid of the form-locking elements 222.

In this exemplary embodiment, the tool adapter 500 carries a small collet holder with an outer thread and a tensioning nut. This makes it possible to tension tools with small shank diameters in a collet. In addition, the axial distance between a cutting edge of the tensioned tool and the flat surface 311 of the collet holder 300 outside the machine tool can be set exactly.

FIG. 7 shows the situation in which the tensioning pin 210 is screwed into a recess 317 in the outer cone 320 of the tool adapter 500.

The recess 317 is frustoconical, as can be seen from FIGS. 7 and 8. The cone angle of the recess 317 and the cone angle of the truncated cone 316 on the tensioning pin 210 are the same. As can be seen from FIG. 7 and FIG. 8, a central axis of the tensioning pin 210 or the inner thread 225 is somewhat offset from a central axis of the recess 317 (see the dash-dotted center lines of the tensioning pin 210 and the recesses 317 that are somewhat offset in the axial direction). The offset is selected such that the outer cone 320 of the tool adapter 500 is pulled into the inner cone 310 by screwing the tensioning pin 210 into the recess 317. As a result, the collar 321 of the tool adapter 500 is pulled against the flat surface 311. As a result, the tool adapter 500 is aligned with very small tolerances and great repeatability in the spindle 100 or the inner cone 310 and the flat surface 311. In other words: Concentricity and runout of a tool tensioned in the tool adapter 500 are very good.

However, designs are also possible in which the collar 321 of the tool adapter 500 has no contact with the flat surface 311 of the spindle 100. Then the tool adapters are positioned and centered over the cones.

Because the recesses 317 are frustoconical, but in any case are rotationally symmetrical with respect to a central axis, not only tensioning forces in the axial direction (i.e. in the direction of an axis of rotation of the spindle 10) can be transmitted by means of the tensioning pin 210 and the recess 317, but also torques, i.e. forces are transmitted in the circumferential direction. In addition, the recess 317 can be made in the outer cone 320 of the tool adapter; it therefore does not require any additional installation space.

FIG. 8 shows the situation that the tensioning pin 210 is unscrewed from the recess 317, such that the tool adapter 500 can be removed from the inner cone 310.

It can also be clearly seen in FIG. 8 that the driver ring 220 serves as a captive device for the roll pin 210. Because the tensioning pin 210 abuts the driver ring 220, the tensioning pin 210 cannot be completely unscrewed from the inner thread.

If the bore 225 in the driver ring 220 is designed as a stepped bore, as illustrated in FIG. 8, the tensioning pin 210 cannot be completely unscrewed and at the same time the driver ring 220 can no longer be removed from the spindle 100 or tool holder 300, since the driver ring is prevented therefrom by the tensioning pin 210. Then the tensioning pin 210 serves as a captive device for the driver ring.

The tensioning pin 210 can in any case be turned so far that the truncated cone 316 no longer dips into the recess 317 of the tool adapter 500.

The interface according to the invention offers considerable advantages when it comes to accommodating tool adapters 500 to 504 in a collet holder 300 in a form-locking manner with high repeatability and very low radial runout deviations and axial runout deviations.

In addition, the tool adapter according to the invention can be used and replaced easily and quickly even in confined spaces.

It is possible to design the interface according to the invention without the driver ring and without the grooves 221 and 223 in the flat surface 311 or the collar 321. The positive torque transmission then takes place by means of the at least one tensioning pin 210.

Alternatively, it is also possible to implement the positive torque transmission between the tool adapter 500 and spindle 100 at the rear end 313 of the inner cone 310 or the collet holder 300. For this purpose, exemplary embodiments are described further below in connection with FIGS. 19, 20, and 21.

FIG. 10 shows an application example of an interface according to the invention. It is a driven angled tool mount 600 with three spindles. Such tool mounts 600 are used, for example, in Swiss-type automatic lathes. Workpieces with a relatively small turning diameter are machined there. There is little space in the work area to change a tool adapter or a tool tensioned in a collet.

A collet 400 having a tensioning nut 401 corresponding to the exemplary embodiment in FIGS. 1 to 3 is inserted into the first spindle. It is easy to imagine that the insertion of a tool and the precise setting of the axial distance between the cutting edges of the tool and the collet holder 300 is difficult and time-consuming in these confined spaces.

Tool adapters 500 according to FIGS. 4 to 9 are inserted into the other two spindles. The driver rings 220 with the through bores 225 and the tensioning pins 210 lying behind are clearly visible.

FIG. 10 also clearly shows that the attachment elements of the tensioning pins 210 are easily accessible with a screwdriver through the through bore 225 of the driver ring 220.

Because the tensioning pins 210 can be easily reached from the side with a screwdriver, the tool adapters 500 according to the invention can easily be exchanged even in these confined installation conditions. A second tool and a second hand of the machine operator to hold it up are not required.

FIGS. 11 and 12 show a second exemplary embodiment of a tool mount 600 according to the invention. In this embodiment there is only one spindle. In FIG. 11, a tool adapter 500 having a driver ring 220 is arranged on the spindle.

In FIG. 12, a collet with a tensioning nut 401 corresponding to FIGS. 1 to 3 is used in the same tool mount.

Various exemplary embodiments of tool adapters 500 to 504 are shown as examples in FIGS. 13 to 16. FIG. 13 shows the tool adapter having the collet according to FIGS. 4 to 9 again.

In the exemplary embodiment according to FIG. 14, a cutting tool (shown here as a drill) and a tool adapter 502 are formed in one piece. This can be done, for example, by soldering a hard metal drill into the actual tool adapter 502.

FIG. 15 shows a tool adapter 503 which has the function of a sealing plug. This tool adapter 503 is always used when a spindle is not required in order to prevent the inner cone 311 of this spindle from becoming dirty and/or the cooling lubricant escaping in an uncontrolled manner through said inner cone into the machine room.

FIG. 16 shows a tool adapter 504 in which the tool adapter carries a turning tool. This turning tool can be enclosed in a fixed tool mount 700 (see FIGS. 17 and 18). The turning tool can also be inserted into a driven tool mount. Then it has the function of a cutter with which internal bores can be drilled out.

A non-driven tool mount 700 is shown schematically in FIG. 17. The non-driven tool mount 700 here has a square shank and an interface according to the invention at one end. For example, a tool adapter 501 can be inserted into this interface according to the invention. The tool adapter 501 can be connected to the tool mount 700 with the aid of the tensioning pin 210. Then this fixed tool adapter 700 can be used as a turning tool. Depending on the requirements, other tool adapters such as, for example, 504 (see FIG. 16) can be used.

FIG. 18 shows two fixed tool mounts 700 (here with cylindrical shank and tensioning surface) arranged side by side. The aforementioned turning tool 504 is tensioned in a tool mount 700. A drill 505 is tensioned in the other tool mount with the aid of a tool adapter 500 having a collet.

The tool mounts 700 are in turn tensioned in a guide, which are part of the Swiss-type automatic lathe or another machine tool.

FIGS. 19 and 20 show two examples of how the positive torque transmission at the rear end of the inner cone 310 or at the rear end of the outer cone 320 of a tool adapter 500 according to the invention can be realized.

In the exemplary embodiment shown in FIG. 19, a polygon 322 is formed at the rear end of the outer cone 320. A complementary polygon is formed in the associated collet holder 300 (not shown). As a result, a torque can be transmitted from the collet holder 300 to a tool adapter 500-504.

In the exemplary embodiment shown in FIGS. 20 and 21, a plurality of radial projections 323 distributed over the circumference are formed at the rear end of the outer cone 320. The complementary axial grooves 325 are visible in the associated collet holder 300 (see FIG. 21). Torque can be transmitted from the collet holder 300 to a tool adapter 500-504 by means of the projections 323 and the axial grooves 325.

FIG. 22 shows a longitudinal section of a tool adapter 500 according to the invention with collet holder 340 for tensioning a tool 505 (here a twist drill) and a spindle 100 with a collet holder 300 according to the invention. It is clear from this illustration that the axial position of the tool 505 can be adjusted relative to the tool adapter 500 by the tool 505 with its cylindrical shaft being pushed more or less far into the collet holder. This adjustment process takes place outside the machine tool with great accuracy and without the machine tool being at a standstill.

If such a tool adapter 500 according to the invention with a preset tool is to be inserted into the collet holder 300 of a tool mount, which is located in the working space of a machine tool, this only requires loosening a tensioning pin 210, inserting the preset tool adapter 500 and tightening the tensioning pin 210. This is very quick and can also be carried out without errors by machine operators with little qualifications.

FIG. 23 shows how it can be ensured in a simple manner that the tool adapter 500-504 can only be inserted into the collet holder 300 in such a way that the recesses on the tool adapter 500-504 interact with the tensioning pins 210 of the collet holder 300. As can be seen from the views in FIG. 23, the widths X, Y of the grooves 221.1 and 221.2 in the collet holder 300 can be different. The same applies correspondingly to the width of the grooves 223.1 and 223.2 on the collar 321 of the tool adapter 500 (not shown in FIG. 23) and to the width of the form-locking elements 222.1 and 222.2 of the driver ring 220 according to the invention (not shown in FIG. 23).

The same effect can be achieved if the depths V, W of the grooves 221.1 and 221.2 are different. The same applies correspondingly to the depth of the grooves 223.1 and 223.2 on the collar 321 of the tool adapter 500 (not shown in FIG. 23) and to the height of the form-locking elements 222.1 and 222.2 of the driver ring 220 according to the invention (not shown in FIG. 23). As a result, the position in which the tool adapter can be inserted into the collet holder is structurally predetermined.

The interface according to the invention is very easy to control in terms of production technology. Another advantage of the interface according to the invention can be seen in the fact that it is possible to use the interface in a first step like a normal collet. Then is closed in the inner thread 315 with a screw 402.

If at a later time the need arises to equip the interface according to the invention with tool adapters 500, 501, 502, 503 or 504, then the necessary tool adapters 500, 501, 502, 503 or 504 can be obtained and used at this time. The interface according to the invention thus offers minimal investment costs if initially only collets are to be used. At the same time, the "upward compatibility" of the solution according to the invention ensures that tool adapters according to the invention can be procured and used at a later point in time and without having to convert the driven tool mount. No interface known from the prior art offers these advantages.

FIGS. 24 and 25 show an embodiment of the driver ring 220 in which the tensioning pin 210 also serves to press off the tool adapter 500-504. This is achieved in that a chamfered or frustoconical countersink 318 is provided on the inside of the through bore 225 of the driver ring 220.

A center of this countersink 318 is preferably arranged somewhat offset to the longitudinal axis of the inner thread 315 or the tensioning pin 210. In FIGS. 24 and 25, the center of the countersink 318 is offset to the right with respect to the longitudinal axis of the inner thread 315 or the tensioning pin 210. This offset is identified by "V" in FIGS. 24 and 25.

If a tool adapter 500-504 tensioned in the inner cone 310 is to be removed from the inner cone 310, then the tensioning pin 210 is also rotated out of the recess 317 in this exemplary embodiment. If the tensioning pin 210 is rotated further out of the recess 317 after it has reached the frustoconical countersink 318 that is arranged offset (see FIG. 25), a force acts in the axial direction on the driver ring 220 (to the left in FIG. 25). This axial force is transmitted via the form-locking elements 222 to the collar 321 of the tool adapter 500-504 and presses it out of the inner cone 310.

In order to reduce the surface pressure between the frustoconical countersink 318 and the tensioning pin 210, a chamfer 319 or a rounding can be attached to the tensioning pin 210.

It is also possible that the through bore 225 of the driver ring 220 is designed as a stepped bore (see FIGS. 7 and 8) and that the transition between the two bore diameters is designed as a frustoconical countersink 318. This variant is not shown in the figures. Their mode of operation corresponds to that of the exemplary embodiment according to FIGS. 24 and 25.

The "V" function depends on the offset "V" between the longitudinal axis of the inner thread 315 or the tensioning pin 210 and the countersink 318.

It is possible to arrange the through bore 225 coaxially with the longitudinal axis of the inner thread 315 or coaxially with the countersink 3318. In the first case, there is a somewhat "nicer" look because the tensioning pin 210 is centered in the through bore 225 for the user. In the second case, the production is a little easier.

LIST OF REFERENCE NUMERALS

100 spindle
101 straight driven tool
102 angled driven tool
103 square shank for turning with tool holder
104 round shank or spindle with tool holder
200 tool holder in the tool mount
210 tensioning pin
220 driver ring with form-locking element(s)
221 groove in the tool mount
222 form-locking element
223 groove in the tool adapter
224 cylindrical section
225 through bore
230 outer thread
300 collet holder
310 inner cone of the collet holder
311 flat surface/flat system on the collet holder
312 front end
313 rear end
314 cylindrical bore
315 inner thread
316 truncated cone
317 recess
318 frustoconical countersink
319 chamfer on tensioning pin 210
320 outer cone on the tool adapter
321 collar/flat surface on the tool adapter
322 polygon
323 projection
325 axial groove
326 groove
330 clear bore
340 tool holder on the tool adapter
400 collet
401 tensioning nut
402 screw plug
500 tool adapters with cutting tool holder 501 tool adapter as turning tool
502 tool adapter with integrated cutting tool
503 tool adapter as sealing plug
504 tool adapter as drill rod tool
505 twist drill
600 driven tool mounts
700 fixed tool mount

What is claimed is:

1. Interface between a collet holder (300) and a tool adapter (500-504), the collet holder (300) comprising an inner cone (310), a flat surface (311), and an outer thread (230) for a tensioning nut (401), wherein the tool adapter (500-504) comprises an outer cone (320) which complements the inner cone (310), and the collet holder (300) has securing means, which are independent of the outer thread (230) and the tensioning nut (401), for the tool adapter (500-504), wherein the securing means comprise one or more radially or diagonally arranged inner threads (315) and a tensioning pin (210) in each inner thread (315), and wherein in the tool adapter (500-504) there are one or more recesses (317) which interact with the tensioning pin(s) (210) characterized in that the tool adapter (500-504) has a collar (321), that the tool adapter (500-504) and the collet holder (300) can be connected in a form-locking manner to one another in the area of the flat surface (311) and the collar (321), that the collet holder (300) has one or more grooves (221, 221.1, 221.2) in the area of the flat surface (311), that the tool adapter (500-504) has one or more grooves (223, 223.1, 223.2) in the area of the collar (321), that the interface comprises a driver ring (220), and that the driver ring (220) has at least one form-locking element (222), which is compatible with the grooves (221, 221.1, 221.2, 223, 223.1, 223.2) in the area of the flat surface (311) and in the area of the collar (321).

2. Interface according to claim 1, characterized in that the grooves (221, 221.1, 221.2) in the area of the flat surface (311) and the grooves (223, 223.1, 223.2) in the area of the collar (321) have different dimensions, shapes, and/or positions.

3. Interface according to claim 1, characterized in that the driver ring (220) covers the outer thread (230) of the collet holder (300).

4. Interface according to claim 1, characterized in that the driver ring (220) has at least one radial or inclined through bore (225), and that the at least one through bore (225) is positioned in such a way that it allows access to the tensioning pin(s) (210) with a screwdriver.

5. Interface according to claim 4, characterized in that a minimum diameter ($D_{min}$) of the through bore (225) is so large that a screwdriver for tightening and loosening the at least one tensioning pin (210) can be inserted into the through bore (225), and that the minimum diameter ($D_{min}$) of the through bore (225) is smaller than a nominal diameter of the at least one tensioning pin (210).

6. Interface according to claim 4, characterized in that the at least one through bore (225) on the inside of the driver ring (220) has a chamfered, rounded, or frustoconical countersink (318).

7. Interface according to claim 1, characterized in that the at least one through bore (225) is designed as a stepped bore, that the stepped bore has a larger diameter on the inside of the driver ring (220) than on the outside of the driver ring (220), and that the diameter on the inside of the driver ring (220) is larger than the nominal diameter of the tensioning pin(s) (210).

8. Interface according to claim 1, characterized in that the collet holder (300) has one or more projections in the area of the flat surface (311) and the tool adapter (500-504) in the area of the collar (321) has one or more recesses that are complementary to the projections.

9. Interface according to claim 8, characterized in that the projections in the area of the flat surface (311) and the recesses in the area of the collar (321) are dimensioned, shaped, and/or positioned differently.

10. Interface according to claim 1, characterized in that the tool adapter (500-504) has one or more projections in the region of the collar (321) and the collet holder (300) in the region of the flat surface (311) has recesses which are complementary to the projections.

11. Interface according to claim 1, characterized in that the tool adapter (500-504) and the collet holder (300) can be connected to one another in a form-locking manner at an end of the inner cone (310) opposite the flat surface.

12. Interface according to claim 11, characterized in that the tool adapter (500-504) and the collet holder (300) can be connected to one another in a form-locking manner by means of a polygon connection.

13. Interface according to claim 11, characterized in that the form-locking connection is designed in the manner of a claw coupling.

14. Interface according to claim 11, characterized in that the form-locking connection in the area of the collet holder (300) and the collar (321) and/or at an end of the inner cone (310) opposite the flat surface (311) predetermines the relative position of the tool adapter (500-504) and tool holder (300) constructively such that the at least one recess (317) and the at least one tensioning pin (210) interact with one another.

15. Interface according to claim 11, characterized in that the form-locking connection in the area of the collet holder (300) and the collar (321) has a larger rotational play than the form-locking connection at the end of the inner cone (310) opposite the plane surface (311).

16. Interface according to claim 11, characterized in that the form-locking connection in the area of the collet holder (300) and the collar (321) has a smaller rotational play than the form-locking connection at the end of the inner cone (310) opposite the plane surface (311).

17. Interface according to claim 1, characterized in that a nominal diameter ($D_{nominal}$) of the outer thread (230) is at least 1.4 times greater than the largest diameter ($D_{max}$) of the inner cone (310).

18. Interface according to claim 17, wherein the nominal diameter ($D_{nominal}$) of the outer thread (230) is 1.5 to 1.8 times greater than the largest diameter ($D_{max}$) of the inner cone (310).

19. Interface according to claim 1, characterized in that the collet holder (300) is integrated in a driven tool mount (600) for a Swiss-type automatic lathe, or a fixed tool mount (700).

20. Interface according to claim 1, characterized in that one or more grooves (326) are present on the outer cone (320) of the tool adapter (500-504).

21. Interface according to claim 1, characterized in that the tensioning pin(s) (210) have a frustoconical tip (316).

22. Interface according to claim 1, characterized in that the tensioning pin(s) (210) have a tip which is arranged eccentrically to an outer thread of the tensioning pin (210).

* * * * *